United States Patent [19]

Nishi et al.

[11] Patent Number: 5,060,864
[45] Date of Patent: Oct. 29, 1991

[54] PERFUME EMITTING DEVICE FOR USE IN AN AUTOMOBILE

[75] Inventors: Masatake Nishi; Tsuneshi Matsuo, both of Hiroshima; Hidemi Aoki, Higashihiroshima; Isao Hirashima, Aki; Yoshiharu Nakagawa, Hiroshima, all of Japan

[73] Assignee: Mazda Motor Corporation, Hiroshima, Japan

[21] Appl. No.: 412,775

[22] Filed: Sep. 26, 1989

[30] Foreign Application Priority Data

Sep. 27, 1988 [JP] Japan .......................... 63-126666[U]
Oct. 6, 1988 [JP] Japan .......................... 63-131062[U]
Oct. 6, 1988 [JP] Japan .......................... 63-131063[U]
Oct. 27, 1988 [JP] Japan .......................... 63-271900

[51] Int. Cl.⁵ .......................................... B05B 17/00
[52] U.S. Cl. ................................. 239/289; 239/274; 239/332; 239/70; 180/286; 49/70
[58] Field of Search ............... 239/274, 289, 70, 332; 222/162, 608, 504; 180/286; 292/201; 49/70; 70/237; 109/20, 29

[56] References Cited

U.S. PATENT DOCUMENTS

| 2,180,967 | 11/1939 | Strobel ........................ 239/274 |
| 3,617,214 | 11/1971 | Dolac ......................... 239/274 |
| 4,056,228 | 11/1977 | Rosenkrantz et al. ......... 239/274 |
| 4,184,612 | 1/1980 | Freyre ........................... 239/70 |
| 4,570,824 | 2/1986 | Bolling ....................... 239/274 |
| 4,621,770 | 11/1986 | Sayem .......................... 239/332 |

FOREIGN PATENT DOCUMENTS 62-90859 6/1987 Japan .
63-7015 1/1988 Japan .

Primary Examiner—Andres Kashnikow
Assistant Examiner—Christopher G. Trainor
Attorney, Agent, or Firm—Wenderoth, Lind & Ponack

[57] ABSTRACT

A perfume emitting device for use in an automobile comprises a tank for storing a perfume emitting material and a perfume atomizing unit connected to the tank. The perfume atomizing unit is provided with a nozzle for atomizing the perfume emitting material and an operation member reciprocably mounted in the perfume atomizing unit for mechanically operating this unit, when a door of the automobile is opened, so that the perfume emitting material may be emitted to the inside of the automobile for a predetermined period of time.

15 Claims, 23 Drawing Sheets

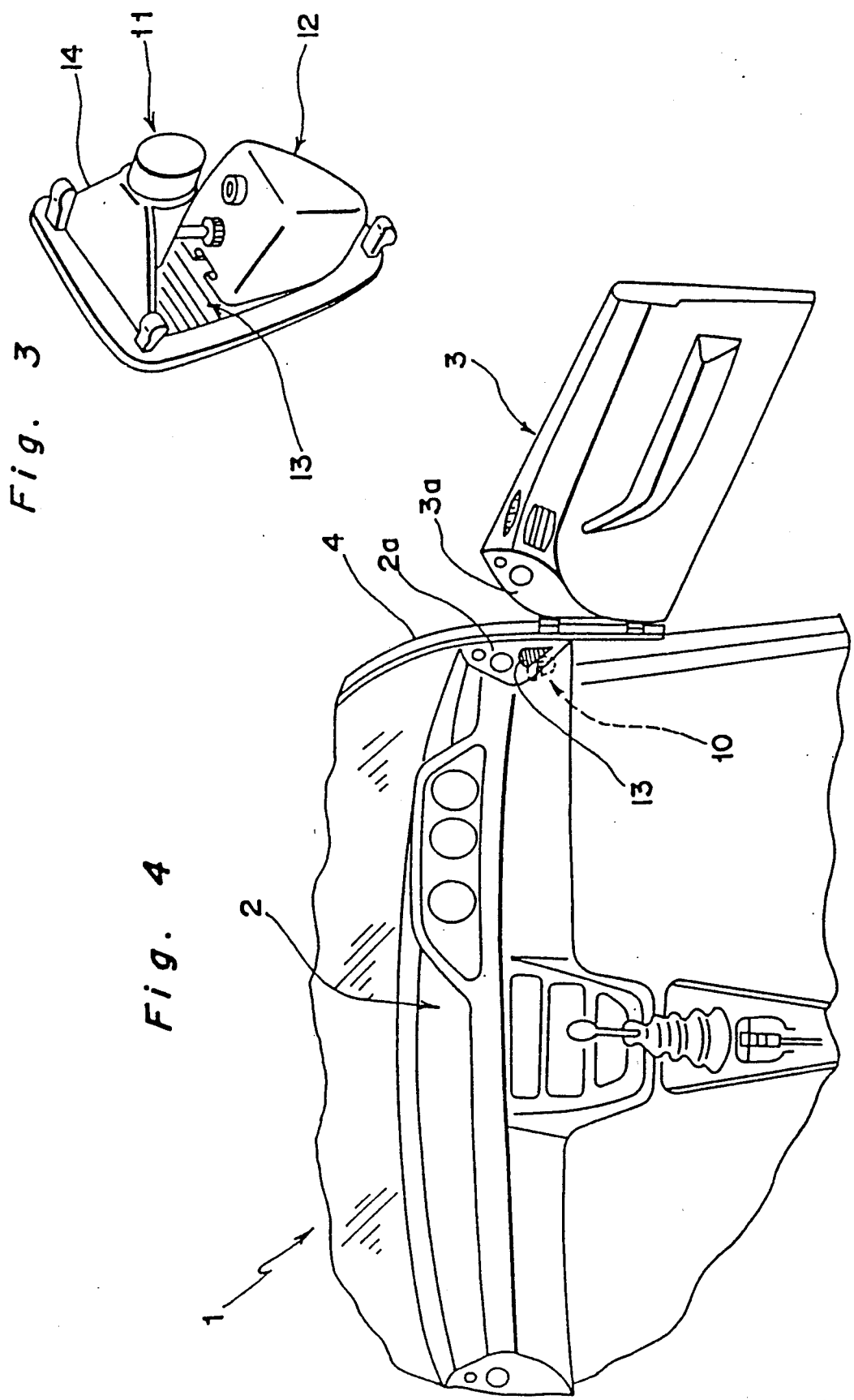

PERFUME EMITTING DEVICE FOR USE IN AN AUTOMOBILE

BACKGROUND OF THE INVENTION

1. Field of the Invention

The present invention relates to a perfume emitting device for use in an automobile which emits a perfume to the inside of the automobile.

2. Description of the Prior Art

Heretofore, perfume emitting material (hereinafter referred to as perfume) which emits an orange or a rose scent is emitted to the inside of an automobile so that a driver feels comfortable in the automobile. In order to emit a perfume to the inside of the automobile, a container which contains a solid or liquid perfume is placed on an instrument panel of the automobile. This type of perfume emitting device is well known.

However, according to this type of perfume emitting device, a perfume is emitted to the inside of the automobile by opening a cover of the container. Therefore, the cover of the container must be opened or closed depending on whether or not a driver wants the perfume to be emitted to the inside of the automobile. In addition, if a liquid perfume is used, evaporation is accelerated when the temperature in the automobile becomes high due to hot weather. Thus, the perfume is consumed in a short period of time. Further, there exists another problem in which the perfume container does not always harmonize with the interior of the automobile. That is, the disposition of the perfume container on the instrument panel is not in harmony with the interior of the automobile, especially in a high-class automobile.

In view of such problems, a perfume emitting device is proposed in, for example, Japanese Utility Model Laid-Open Publication No. 63-7015. According to this disclosure, the perfume emitting device comprises an exhaust removing means, for discharging a bad smell emitting component to the outside of the automobile, which remains in a ventilation path of an air conditioner mounted on the automobile, and a perfume atomizing means for atomizing and discharging a perfume to the inside of the automobile in synchronization with the operation of the exhaust removing means, wherein the exhaust removing means and the perfume atomizing means are operated in unison with the opening of the door.

According to this prior art, a bad smell can be removed and a perfume can be automatically emitted into the automobile in unison with the door opening operation. However, the construction and operation of the perfume emitting device are complicated because it necessitates the provision of the exhaust removing means, the perfume atomizing means, detecting means for detecting the operation for opening and closing the door, and control means for controlling these means.

SUMMARY OF THE INVENTION

Accordingly, the present invention has been developed with a view to substantially eliminating the above described disadvantages inherent in the prior art perfume emitting device for use in an automobile, and has for its essential object to provide an improved perfume emitting device of a simple construction capable of reliably emitting a perfume in unison with the door opening operation.

Another important object of the present invention is to provide a perfume emitting device of the above described type which can be prevented from emitting the perfume when a driver does not want the perfume to be emitted any more or from repeatedly emitting the perfume within a short period of time.

In accomplishing these and other objects, a perfume emitting device according to one preferred embodiment of the present invention is provided with a tank for storing a perfume emitting material and a perfume atomizing means connected to the tank. The perfume atomizing means includes a nozzle formed therein for atomizing the perfume emitting material and an operation member reciprocably mounted therein for mechanically operating the perfume atomizing means, when a door of the automobile is opened, so that the perfume emitting material can be emitted to the inside of the automobile for a predetermined period of time.

In another aspect of the present invention, the perfume emitting device is further provided with a lock means for locking the operation member so that the perfume atomizing means may be rendered inoperative.

In a further aspect of the present invention, the perfume emitting device is provided with a tank for storing a perfume emitting material, a perfume atomizing means connected to the tank and including a nozzle for atomizing the perfume emitting material and an operation means for operating the perfume atomizing means, when a door of the automobile is opened, so that the perfume emitting material can be emitted into the automobile for a predetermined period of time, a detecting means for detecting that the door has been opened, and an operation prohibiting means for prohibiting the perfume atomizing means from being operated for a predetermined period of time after the perfume atomizing means has once been operated.

In a still further aspect of the present invention, there is provided a perfume emitting arrangement, which is comprised of a door lock device for locking a door of an automobile, a door outer handle connected to the door lock device and adapted to perform an operation to open the door from outside of the automobile, and a perfume emitting means for emitting a perfume emitting material to the inside of the automobile only when the door lock device is unlocked and the operation for opening the door is performed by the door outer handle.

According to the present invention, the perfume emitting material can be reliably supplied into the automobile in unison with an operation for opening the door of the automobile because the operation member is reciprocably mounted in and mechanically affects operation of the perfume atomizing means when the door is opened.

When the lock means for locking the operation member is provided in the perfume emitting device, a driver can stop the emission of the perfume emitting material by using the lock means.

Furthermore, when the operation prohibiting means is provided, the perfume atomizing means is prohibited from being operated for a predetermined period of time after the perfume atomizing means has once been operated, even when operations for opening and closing the door are performed. Accordingly, the perfume can be automatically emitted to the inside of the automobile in unison with only the first door opening operation even though the door is repeatedly opened and closed within a short period of time.

In addition, when the perfume emitting means is rendered operative when the door lock device is unlocked and only when an operation for opening the door is carried out by means of the door handle, the perfume can be reliably emitted to the inside of the automobile only when a driver gets into the automobile.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein:

FIG. 3 is a perspective view of the perfume emitting device of FIG. 1;

FIG. 4 is a perspective view of the front portion of the inside of an automobile in which the perfume emitting device of FIG. 1 is mounted;

DETAILED DESCRIPTION OF THE PREFERRED EMBODIMENTS

Figure 1:
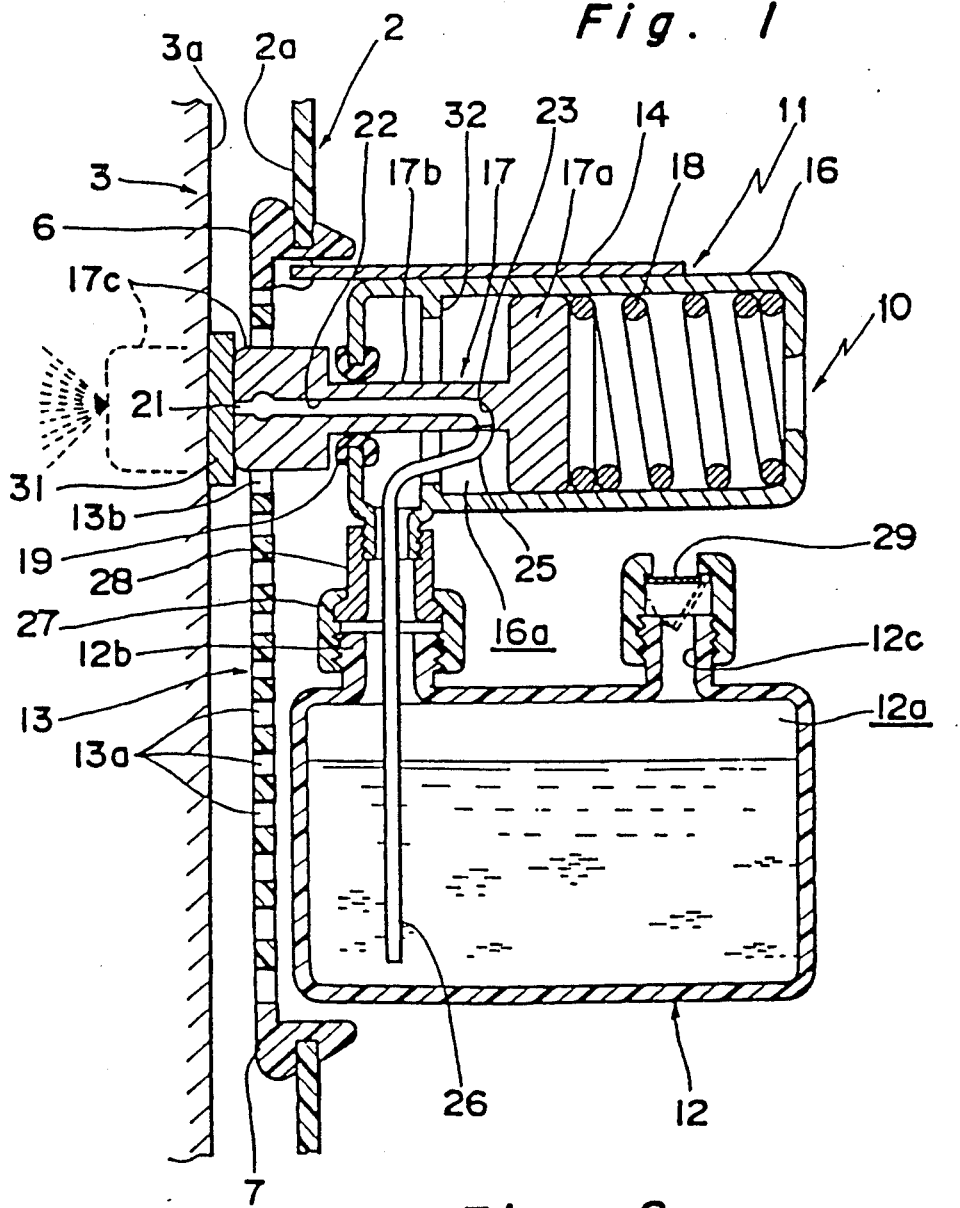
FIG. 1 is a vertical sectional view of a perfume emitting device according to a first embodiment of the present invention.

Referring now to the drawings, there is shown in FIG. 4 an automobile 1 to which the present invention is applied.

As shown in FIG. 4, an instrument panel 2 disposed in the front portion of the automobile 1 is mounted between left and right hinge pillars 4 and 4 for mounting left and right front doors 3 and 3 (only the right side is shown in FIG. 4). The end face 2a of the instrument panel 2 confronts the end face 3a of a portion for mounting the front door 3 (hereinafter referred to as door) when the door 3 is closed. A perfume emitting device 10 according to the present invention for atomizing a perfume in unison with an operation for opening the door 3 is provided in the inside of the end face 2a of the instrument panel 2, which confronts the end face 3a of the right side door 3 (door on the side of a driver's seat) when the door 3 is closed.

As shown in FIGS. 1 and 3, the perfume emitting device 10 is mounted on the end face 2a of the instrument panel 2 by means of grommets 6 and 7. The perfume emitting device 10 comprises a grille 13 including a plurality of slits 13a which are open to the outside, a tank 12 disposed inside the grille 13 and storing a liquid perfume, and a perfume atomizing unit 11 mounted on the grille 13 and connected to the tank 12.

As shown in detail in FIG. 1, the perfume atomizing unit 11 comprises a cylindrical case 16 and a push rod 17 having a large diameter portion 17a accommodated and slidable in the case 16. The push rod 17 is urged forward (on the side of the grille) by a spring 18 mounted between the rear end portion (end portion opposite to the grille) of the case 16 and the large diameter portion 17a.

A shaft 17b of the push rod 17 is slidably accommodated in the case 16 through a sealing member 19. A head portion 17c of the push rod 17 is slidably inserted through an opening 13b formed in the grille 13 and as described in detail later, reciprocates with respect to the end face 3a of the door 3. A duct 22 extends through the center of the shaft 17b from a nozzle portion 21 formed on the top of the head portion 17c of the push rod 17 to the vicinity of the large diameter portion 17a. One end of a flexible vinyl tube 25 is connected to an opening 23 formed on the end portion of the duct 22 and the other end thereof is connected to a hose 26 whose end portion is disposed in the perfume stored in the tank 12.

Figure 2:
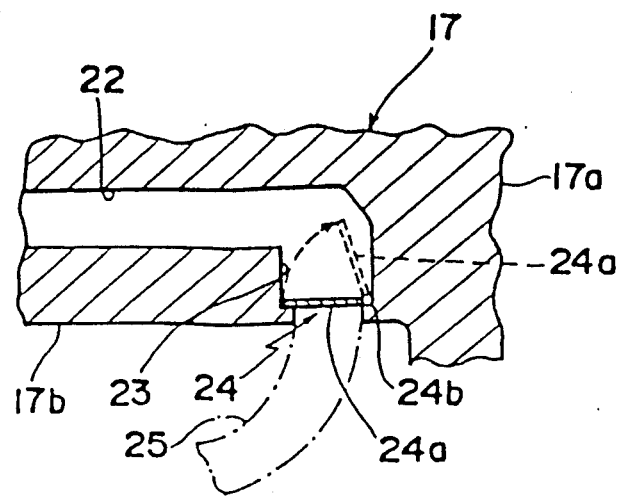
FIG. 2 is a partially sectional view of a push rod employed in the perfume emitting device of FIG. 1.

As shown in detail in FIG. 2, the opening 23 is provided with a swing type check valve 24 (first check valve) having a plate-shaped valve 24a, which is pivotable about an axis 24b. The first check valve 24 opens only when the pressure in a space 12a defined above the level of the perfume is higher than the atmospheric pressure in the duct 22.

A mounting portion 12b of the tank 12 is fastened to a connecting member 28 mounted on the lower portion of the case 16 through a joint member 27. Therefore, the tank 12 is removable from the perfume atomizing unit 11. When no perfume is left in the tank 12, the tank 12 can be removed from the perfume atomizing unit 11 by loosening the joint member 27. Thus, perfume can be easily supplied to the tank 12. The space 12a of the tank 12 communicates with a chamber 16a defined by the case 16, the large diameter portion 17a and shaft 17b of the push rod 17 through the mounting portion 12b and the connecting member 28 of the case 16.

Although not shown, a sealing member mounted on the periphery of the large diameter portion 17a seals the space between the large diameter portion 17a and the case 16 such that it is airtight. An atmospheric pressure introducing opening 12c is formed on the upper portion of the tank 12. The atmospheric pressure introducing opening 12c is provided with a swing type second check valve 29 which opens only when the pressure in the space 12a of the tank 12 is lower than the atmospheric pressure outside the tank 12.

The operation of the perfume emitting device 10 constructed as above is described hereinbelow.

When the door 3 is kept closed as shown by the solid line in FIG. 1, the head portion 17c of the push rod 17 is in contact with a plate 31 fixed to the end face 3a of the door 3 and the push rod 17 is moved backward by the door 3 against the urging force of the spring 18 to such an extent that the head portion 17c is disposed in the vicinity of the grille 13. When the door 3 is opened in this condition, the push rod 17 slides by virtue of the urging force of the spring 18, as shown by the broken line in FIG. 1, and moves forward until the large diameter portion 17a is stopped by a stopper 32 formed on the inner face of the case 16. At this time, the pressure in the chamber 16a increases with the decrease of the volume thereof, which in turn, leads to the increase of the pressure in the space 12a of the tank 12. Consequently, the perfume contained in the tank 12 is pressurized and fed toward the push rod 17 through the hose 26 and the vinyl tube 25. In this event, the first check valve 24 is opened by the pressure of the perfume. Accordingly, the perfume is introduced into the duct 22 and, as shown by the broken lines in FIG. 1, atomized from the nozzle portion 21.

When the door 3 is closed again after the perfume has been atomized, the push rod 17 is moved backward. At this time, the pressure in the chamber 16a returns to the initial condition with the increase of the volume thereof. As a result, the pressure in the space 12a returns to the initial condition as well. Accordingly, the first check valve 24 is closed and as such, the perfume atomizing operation is stopped.

As described above, according to this embodiment, the push rod 17 is mounted on the end face 2a of the instrument panel 2 so that the push rod 17 reciprocates with respect to the end face 3a of the mounting portion of the door 3 confronting the end face 2a. Thus, the pressure in the chamber 16a is increased by the movement of the push rod 17. As a result, the perfume in the tank 12 is pressurized and atomized from the nozzle portion 21. Accordingly, the push rod 17 can be moved toward the door 3 in association with the operation for opening the door 3 and as such, the perfume contained in the tank 12 is pressurized by increasing the pressure in the chamber 16a. Thus, the perfume can be atomized from the nozzle portion 21.

As apparent from the description made above, the atomization of the perfume can be reliably accomplished in unison with the operation for opening the door 3, namely, by the door opening/closing stroke.

Although the perfume emitting device 10 is mounted on the instrument panel 2 in the above-described embodiment (hereinafter referred to as first embodiment), it may be mounted on the door 3.

In the first embodiment, the duct 22 through the push rod 17 communicates with the hose 26 via the vinyl tube 25 so that the perfume contained in the tank 12 can be introduced into the nozzle portion 21. However, the perfume can be introduced into the nozzle portion 21 through the chamber 16a of the case 16, without the use of the vinyl tube 25.

A second embodiment of the present invention is described hereinbelow, in which the same parts as those of the first embodiment are designated by the same reference numerals and the descriptions thereof are omitted.

Figure 5:
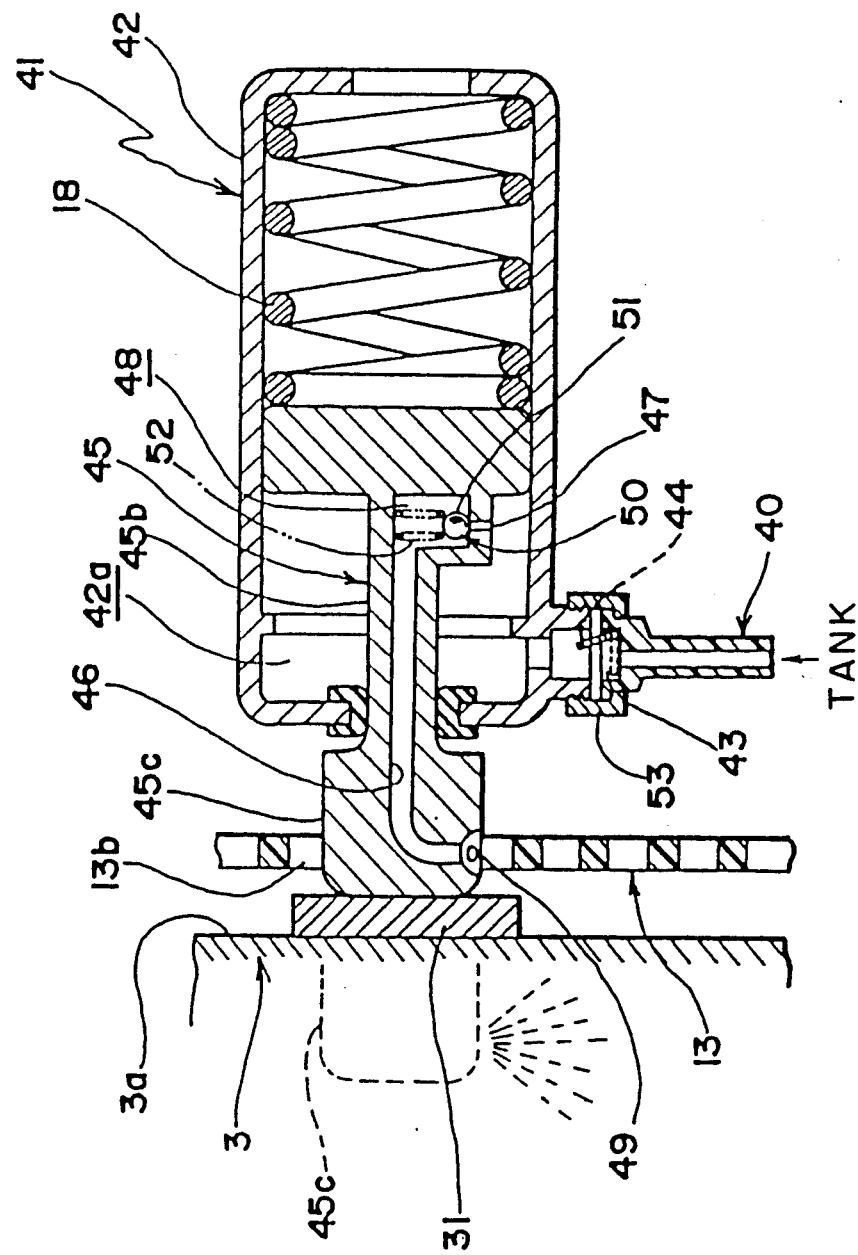
FIG. 5 is a vertical sectional view of a perfume atomizing unit of a perfume emitting device according to a second embodiment of the present invention.

As shown in FIG. 5, in order to introduce a perfume contained in a tank 12 into a first chamber 42a of a case 42, a pipe 40 is provided with one end opening into the perfume in the tank 12, and the other end (end portion on the side of a perfume atomizing unit 41) of the pipe 40 is fastened to the lower connecting portion of the case 42 through a threaded joint 53 and open in the first chamber 42a. An opening portion 43 is provided with a swing type check valve 44 which opens only when the pressure of the perfume i.e. the pressure of the space 12a in the tank 12 is higher than the pressure in the first chamber 42a.

Provided on the rear portion of a duct 46 through a push rod 45 is a second chamber 48 which communicates with the first chamber 42a through an opening 47. Disposed adjacent the opening 47 of the second chamber 48 is a check ball valve 50 comprising a ball valve 51 and a spring 52 which urges the ball 51 toward the opening 47. When the pressure in the first chamber 42a is higher than the atmospheric pressure in the second chamber 48, the check ball valve 50 is opened such that the first chamber 42a and the second chamber 48 communicate with each other. In this embodiment, a nozzle portion 49 mounted on the side face of a head portion 45c of the push rod 45 is set so that it faces the inside of the automobile when the door 3 is opened.

When the door 3 is closed, as shown in FIG. 5, the push rod 45 is moved backward and the pressure in the first chamber 42a is reduced with the increase of the volume thereof. As a result, the swing type check valve 44 is opened by the pressure in the tank 12 and as such, the perfume is introduced into the first chamber 42a. At this time, since the check ball valve 50 is closed by the urging force of the spring 52 and the atmospheric pressure in the duct 46, the perfume is not atomized from the nozzle 49.

When the door 3 is opened in this condition, the push rod 45 is pushed toward the door 3 by the urging force of a spring 18, as shown by the broken line in FIG. 5, and the pressure in the first chamber 42a increases with the reduction of the volume thereof. Accordingly, the swing type check valve 44 is closed and the check ball valve 50 is opened, and the perfume contained in the first chamber 42a is atomized from the nozzle portion 49 toward the inside of the automobile. That is, when the door 3 is closed, the perfume introduced into the first chamber 42a is supplied to the inside of the automobile. The perfume emitting device emits this amount per opening of the door 3.

As apparent from the foregoing description, according to this embodiment, only the amount of perfume introduced into the first chamber 42a can be supplied to the inside of the automobile when the door 3 is closed. Accordingly, the perfume can be reliably and stably atomized every time the door 3 is opened. Further, according to this embodiment, the nozzle portion 49 mounted on the side face of the head portion 45c of the push rod 45 is directed to the inside of the automobile when the door 3 is opened. Therefore, compared with the first embodiment in which the nozzle portion 21 is open at the end face of the head portion 17c of the push rod 17 and the perfume is atomized toward the end face 3c of the door 3 which confronts the head portion 17c, the perfume can be effectively atomized to the inside of the automobile according to the second embodiment.

The perfume atomizing means according to the first or second embodiment includes the perfume atomizing unit 11 or 41, which is primarily comprised of the push rod 17 or 45 provided with the nozzle portion 21 or 49, the spring 18 for urging the push rod 17 or 45, and the case 16 or 42 accommodating the push rod 17 or 45 and the spring 18. This perfume atomizing unit 11 or 41 is connected to the tank 12. But instead, a well-known spray-type perfume emitting device of spray may be used.

Figure 6:
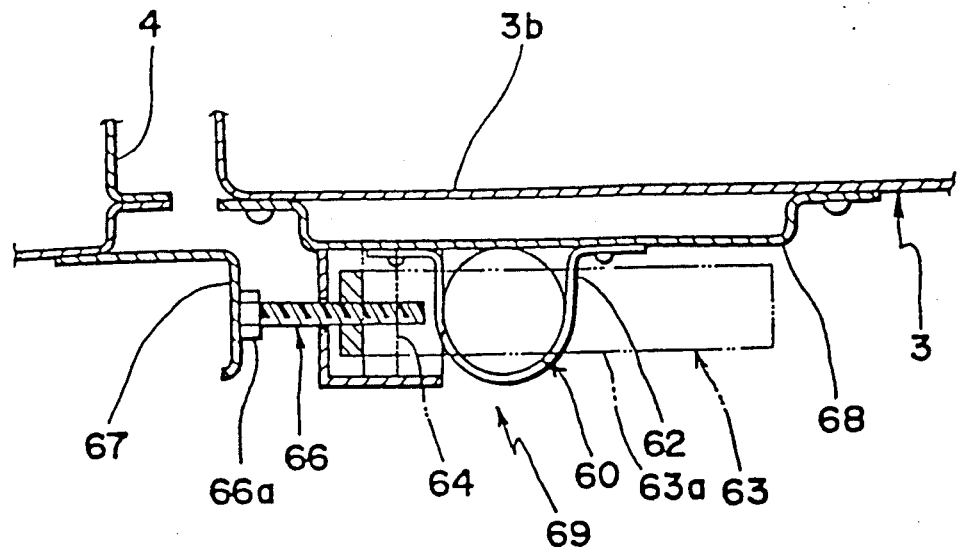
FIG. 6 is a section taken along the line VI-VI in FIG. 7.
Figure 7:
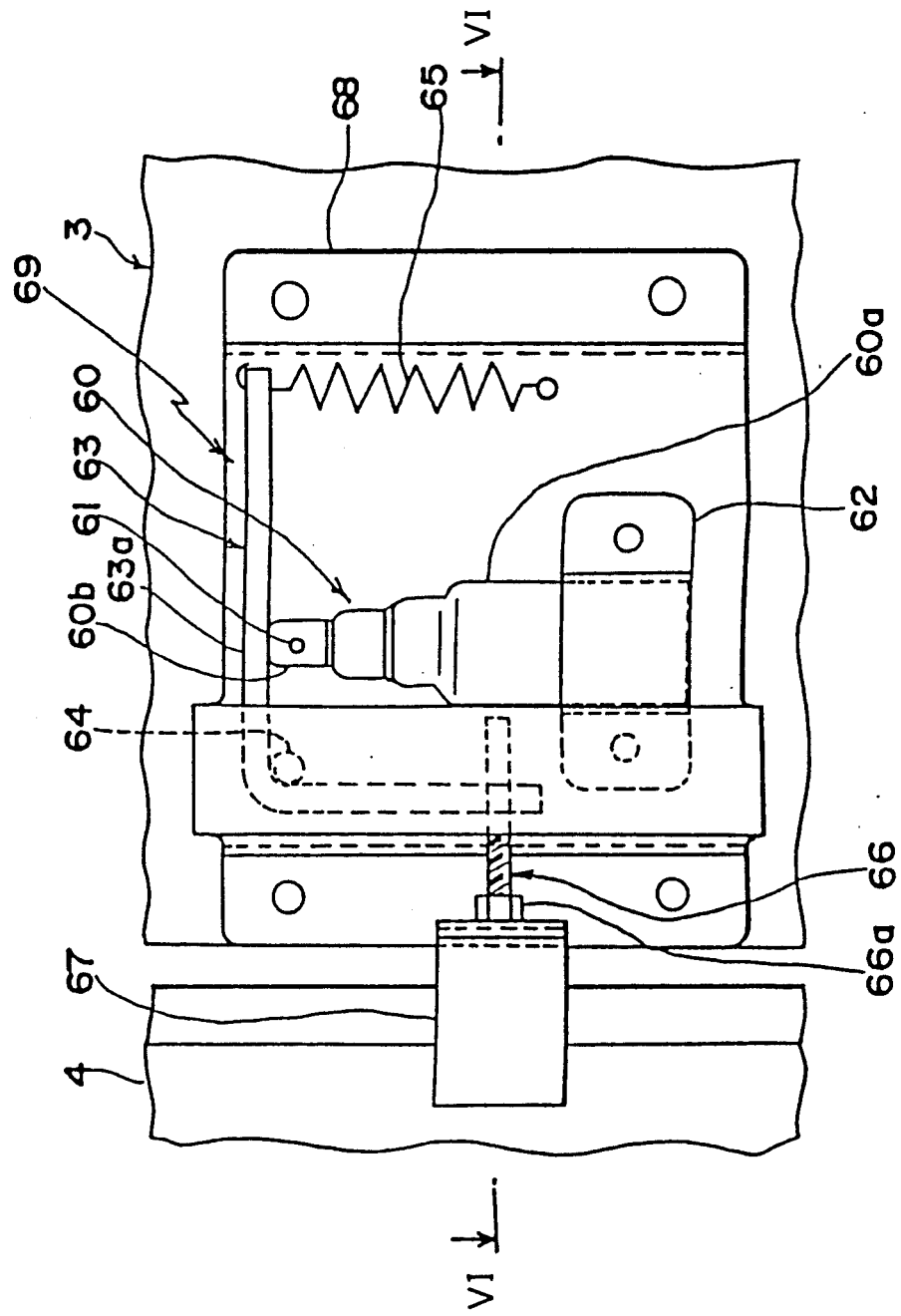
FIG. 7 is an elevational view of a perfume emitting device according to a third embodiment of the present invention.

A third embodiment of the present invention is described hereinbelow with reference to FIGS. 6 and 7.

In this embodiment, a mounting plate 68 for mounting a perfume emitting device 69 is fastened to a door panel 3b of the door 3 mounted on the hinge pillar 4. A spray unit 60 is fixed to the mounting plate 68 through an approximately U-shaped bracket 62. As is known, a liquid perfume contained in a main body 60a is atomized from the nozzle of the spray unit 60 by pressing a head portion 60b toward the main body 60a. A predetermined amount of the liquid perfume is atomized per operation of the spray unit 60. The detailed drawings of the internal construction of the spray unit 60 and the description thereof are omitted because the construction and operation thereof are similar to those of known ones.

An approximately L-shaped operation member 63 pivotally supported by a shaft 64 is disposed above the spray unit 60. The end portion of the operation member 63 opposite to the hinge pillar 4 is urged downward by a tension spring 65. An operation rod 66 is fastened to the operation member 63 in the vicinity of the other end portion thereof.

The hinge pillar 4 is provided with a bracket 67 confronting the operation rod 66. The bracket 67 is brought in contact with a head portion 66a of the operation rod 66 when the door 3 is closed and presses the operation rod 66 toward the side opposite to the hinge pillar 4. The length of the operation rod 66 and the position on which the bracket 67 is mounted are set so that, with the door 3 closed, a pressing portion 63a may be substantially horizontal because a counterclockwise torque which acts on the operation member 63 through the operation rod 66 balances with a clockwise torque which acts thereon due to the tension spring 65. Accordingly, after the door 3 is closed, no force is applied to the head portion 60b of the spray unit 60. Thus, the perfume contained in the main body 60a is not atomized.

When the door 3 is opened in this condition, the torque about the supporting shaft 64, which acts on the operation member 63, is lost, and consequently, the operation member 63 is rotated clockwise by the urging force of the tension spring 65. As a result, the pressing portion 63a presses the head portion 60b and as such, the perfume is atomized from an opening 61 to the inside of the automobile.

In each of the above-described embodiments, the operation member for operating the perfume atomizing means is newly mounted on the automobile. However, parts conventionally mounted on the automobile, for example, a door checker for detecting the opening and closing of the door can be utilized to achieve an operation similar to that obtained in each of the above-described embodiments.

A fourth embodiment of the present invention is described hereinbelow.

Figure 8:
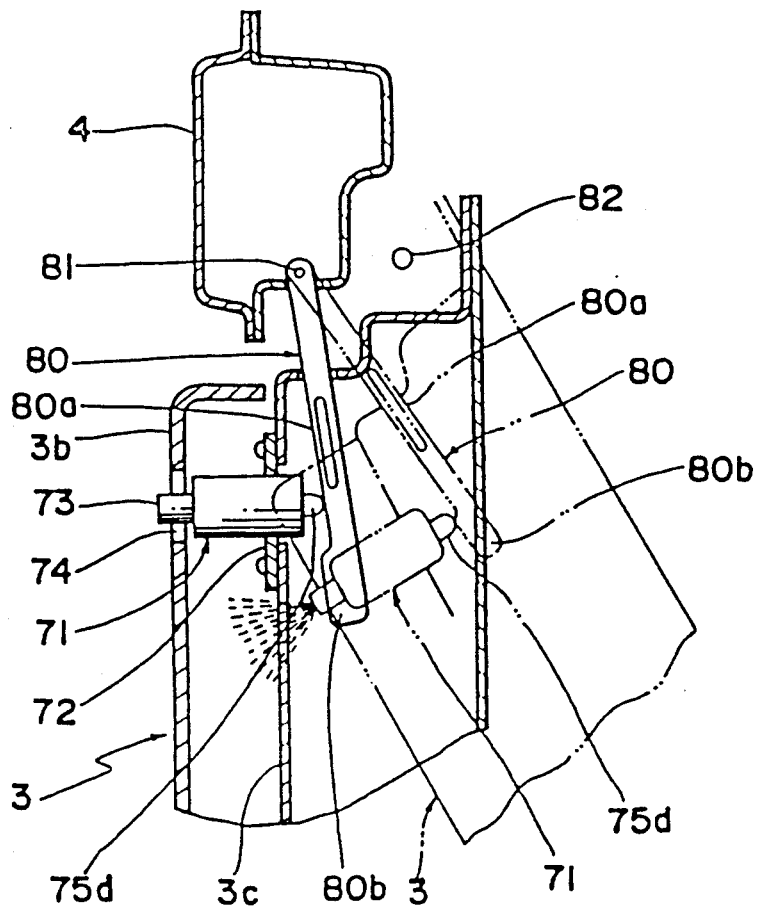
FIG. 8 is a transverse sectional view of a front door on which a perfume atomizing unit of a perfume emitting device according to a fourth embodiment of the present invention is mounted.
Figure 9:
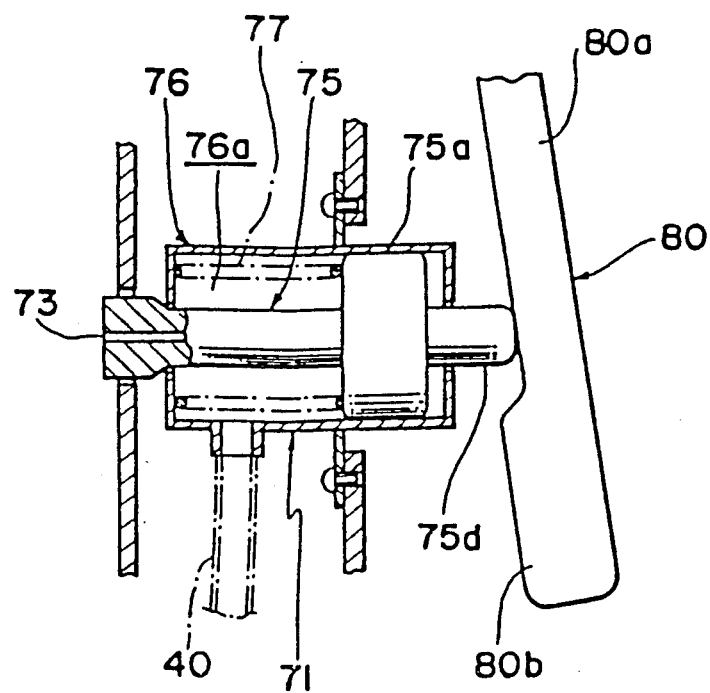
FIG. 9 is a vertical sectional view of the perfume atomizing unit shown in FIG. 8.

As shown in FIGS. 8 and 9, according to the fourth embodiment, a perfume atomizing unit 71 is mounted on a reinforcement 3c of the door 3 through a mounting bracket 72, and a nozzle portion 73 faces the inside of the automobile through an opening 74 formed in the door inner panel 3b.

In the perfume atomizing unit 71 according to this embodiment, a spring 77 which urges a push rod 75 toward the side opposite to a nozzle portion 73 is mounted in a chamber 76a into which the perfume stored in a tank (not shown) is introduced through a pipe 40 similarly to that of the second embodiment, and the push rod 75 is provided with a projection 75d extending from a large diameter portion 75a toward the side opposite to the nozzle portion 73 and projecting from a case 76. Although not shown, the perfume atomizing unit 71 is provided with a swing type check valve and a check ball valve similar to those of the second embodiment. Thus, the push rod 75 slides toward the nozzle portion 73, whereby the perfume can be atomized similarly to the second embodiment.

As shown in FIG. 8, a bar-shaped door checker 80 for detecting door opening and closing operations is pivotally mounted on a shaft 81 of the hinge pillar 4, on which the door 3 is mounted. The door checker 80 is disposed on the side opposite to the nozzle portion 73 of the perfume atomizing unit 71 and in contact with the projection 75d of the push rod 75 of the perfume atomizing unit 71. A pressing portion 80b projecting toward the perfume atomizing unit 71 is formed on one end portion of the main body 80a of the door checker 80. When the door 3 is closed as shown by the solid line in FIG. 8, the main body 80a of the door checker 80 is in contact with the projection 75d of the push rod 75. When the door 3 is opened about a hinge axis 82, the pressing portion 80b of the door checker 80 contacts with the projection 75d, as shown by the double dotted chain line in FIG. 8, because the radius of rotation of the door checker 80 and that of the perfume atomizing unit 71 are different from each other. Accordingly, the push rod 75 is pressed and slides toward the nozzle portion 73 through the projection 75d. Thus, the perfume is atomized similarly to the second embodiment.

As described above, according to this embodiment, the perfume atomizing unit 71 is operated utilizing the movement of the door checker 80 conventionally mounted in an automobile. Therefore, the cost required for installing the perfume emitting device in the automobile can be reduced, as compared with the cost for newly mounting the operation member in the automobile.

In the above-described embodiments, the perfume emitting device is constructed by integrating the perfume atomizing unit provided with the nozzle with the tank for storing the perfume. However, the perfume emitting device can be laid out more freely if the perfume emitting device is provided with the nozzle, the perfume atomizing unit, and the tank as separate element.

A fifth embodiment of the present invention is described hereinbelow with reference to FIGS. 10 to 12.

Figure 10:
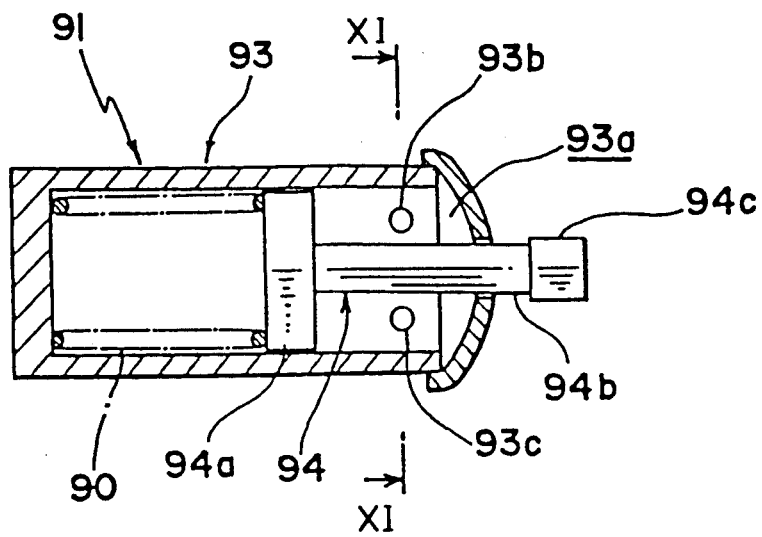
FIG. 10 is a vertical sectional view of a perfume atomizing unit of a perfume emitting device according to a fifth embodiment of the present invention.
Figure 11:
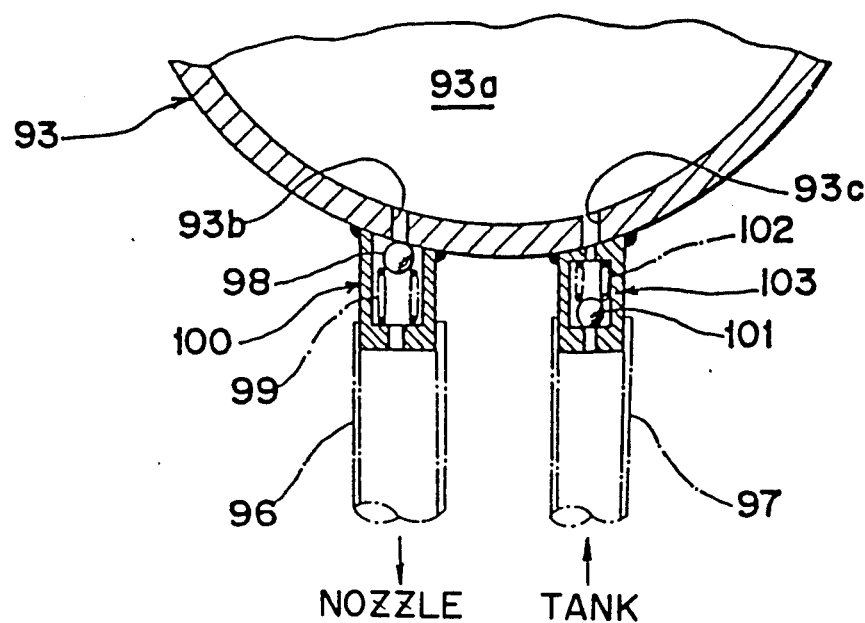
FIG. 11 is a partial section taken along the line XI—XI in FIG. 10.

As shown in FIGS. 10 and 11, no nozzle portion is mounted on a push rod 94 which operates a perfume atomizing unit 91 and is urged by a spring 90. A case 93 is provided, on the side face thereof, with a perfume discharge opening 93b which communicates a chamber 93a for introducing the perfume with a nozzle 95 provided separately from the perfume atomizing unit 91 through a vinyl tube 96 (first vinyl tube) as shown in FIG. 12. The discharge opening 93b is provided with a check ball valve 100 (first check valve) which comprises a ball valve 98 and a spring 99 and opens only when the pressure in the chamber 93a increases. The case 93 is also provided, on the side face thereof, with a perfume inlet port 93c which communicates the chamber 93a with a tank 92 provided separately from the perfume atomizing unit 91 through a second vinyl tube 96, as shown in FIG. 12. The inlet port 93c is provided with a second check valve 103 which comprises a ball valve 101 and a spring 102 and opens only when the pressure in the chamber 93a is reduced.

Figure 12:
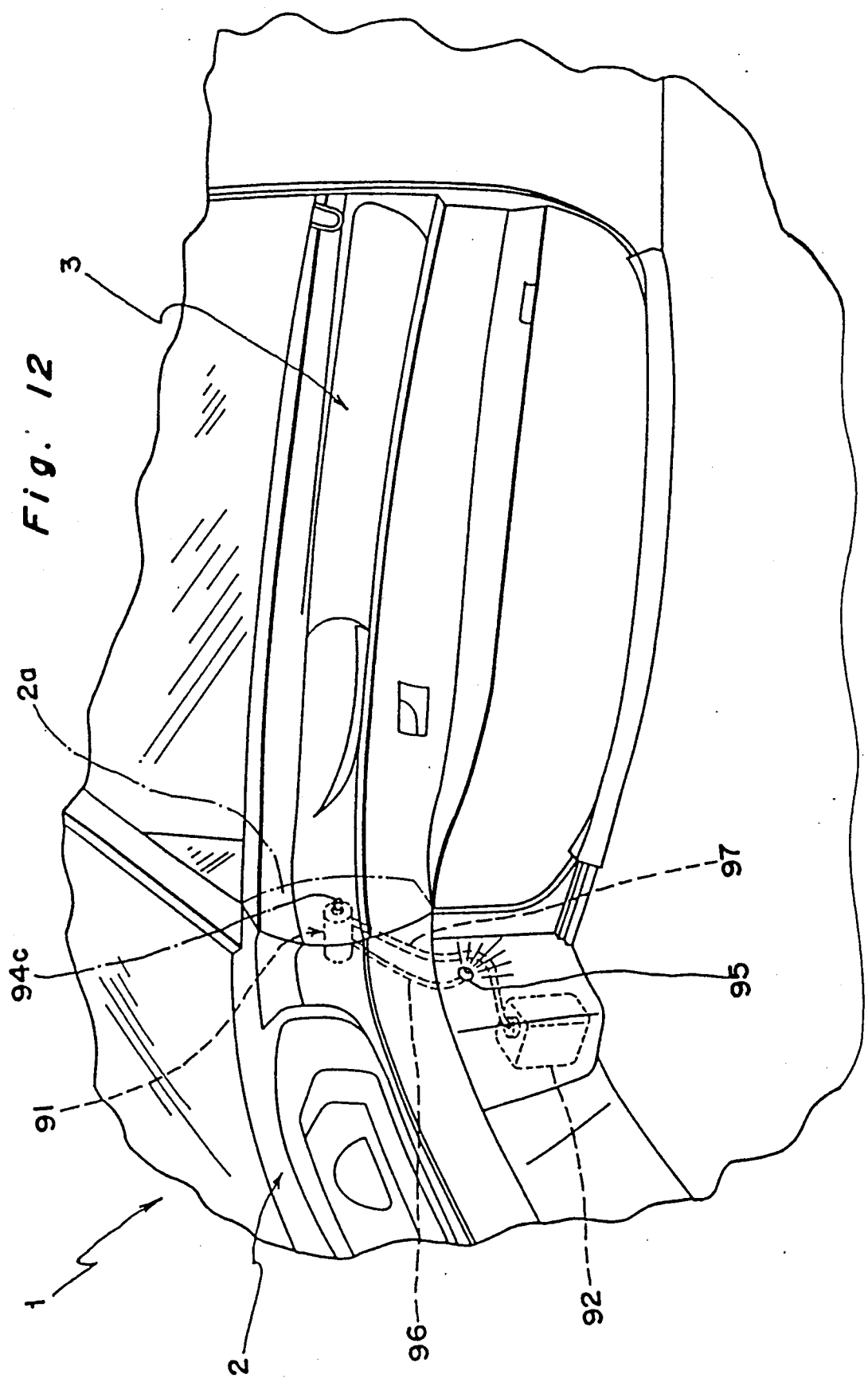
FIG. 12 is a perspective view of the front portion of the inside of an automobile provided with the perfume emitting device according to the fifth embodiment.

As shown in FIG. 12, the perfume atomizing unit 91 constructed as described above is mounted on the instrument panel 2 so that a head portion 94c of the push rod 94 projects from the end face 2a of the instrument panel 2 toward the door 3. The nozzle 95 is mounted on the instrument panel 2 such that the nozzle 95 is disposed below the perfume atomizing unit 91, and the tank 92 is accommodated in a lower space of the instrument panel 2.

When the door 3 is opened, the push rod 94 slides toward the door 3 and, consequently, the pressure in the chamber 93a increases. As a result, the first check valve 100 is opened and the perfume in the chamber 93a is discharged to the nozzle 95 through the first vinyl tube 96 so that the perfume may be emitted from the nozzle 95 to the inside of the automobile. When the door 3 is closed, the push rod 94 is pressed toward the inside of the case 93. As a result, the pressure in the chamber 93a is reduced, which leads to the closing of the first check valve 100 and the opening of the second check valve 103. Thus, the perfume in the tank 92 is drawn into the chamber 93a through the second vinyl tube 97.

In the fifth embodiment, the head portion 94c of the push rod 94 is integrally formed with the push rod 94, but the push rod 94 may be composed of a push button which reciprocates in unison with operations for opening and closing the door 3 and a piston which is slidably accommodated inside the case of the perfume atomizing unit and corresponds to the large diameter portion 94a and the shaft 94b as shown in FIG. 10. In such a construction, the perfume emitting device can be freely laid out.

Figure 13:
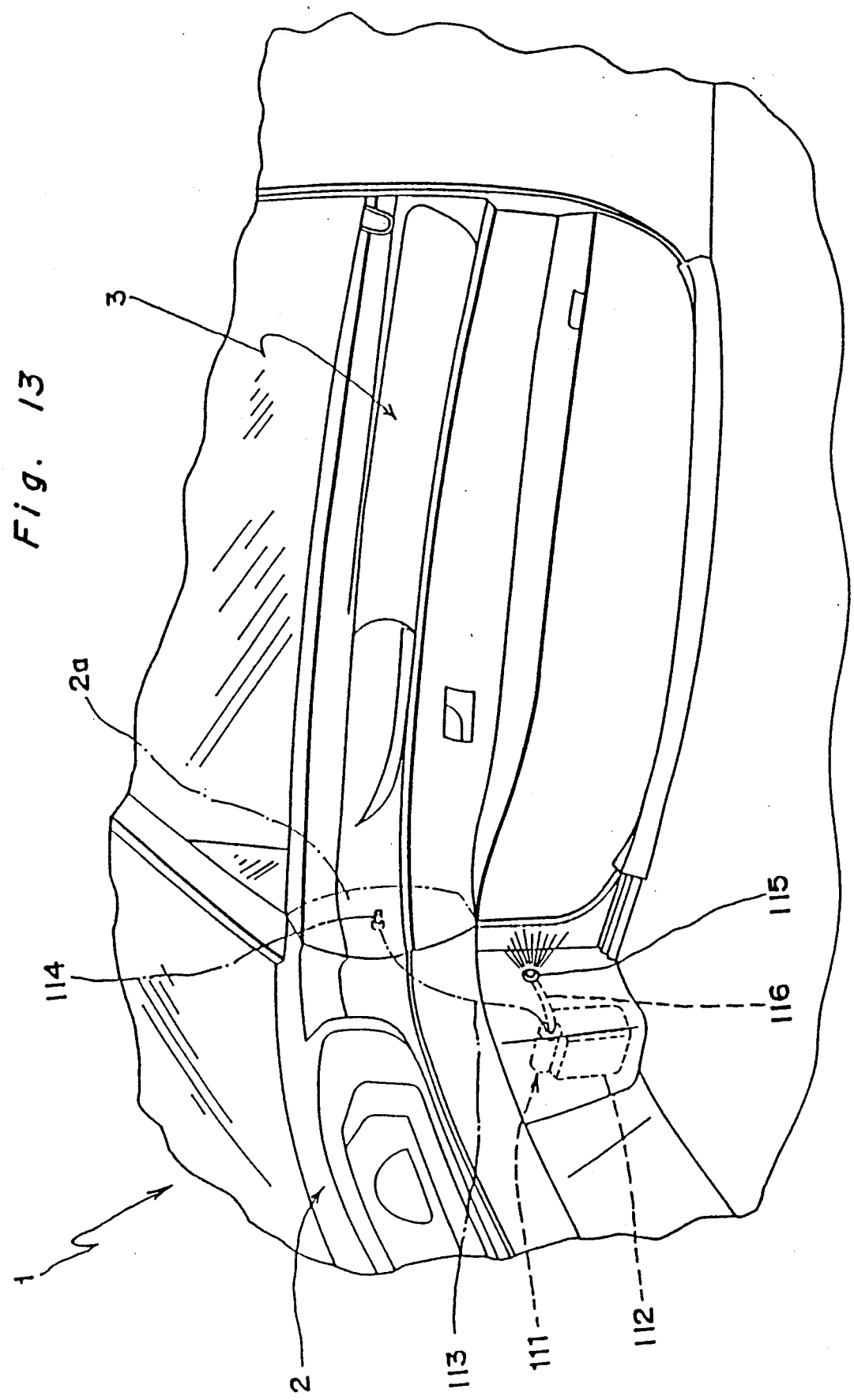
FIG. 13 is a perspective view of the front portion of the inside of an automobile provided with a perfume emitting device according to a sixth embodiment of the present invention.

A sixth embodiment of the present invention is described hereinbelow with reference to FIG. 13.

In this embodiment, a push button 114 which reciprocates in association with operations for opening and closing the door 3 is mounted on the end face 2a of the instrument panel 2, and a nozzle 115 is mounted on the instrument panel 2 at a portion below the push button 114, and a tank 112 is disposed in the instrument panel 2 at a lower portion thereof. A perfume atomizing unit 111 provided with a piston (not shown) is disposed immediately above the tank 112. Preferably, the perfume atomizing unit 11 is integrated with the tank 112. The perfume atomizing unit 111 and the nozzle 115 are connected to each other by means of a vinyl pipe 116. The piston of the perfume atomizing unit 111 and the push button 114 are connected to each other by means of a flexible wire 113. The reciprocation motion of the push button 114 which occurs in unison with operations for opening and closing the door 3 is transmitted to the piston of the perfume atomizing unit 111 through the flexible wire 113. Thus, the perfume atomizing unit 111 is capable of performing an operation similar to that of the fifth embodiment.

In the perfume atomizing unit to be operated by the push rod or the push button in the above-described embodiments, the perfume stored in the tank or the perfume introduced into the chamber provided in the case of the perfume atomizing unit is directly pressurized so that the perfume can be atomized from the nozzle. Alternatively, the perfume contained in the tank can be atomized from the nozzle together with air by making use of a negative pressure generated when pressurized air is fed through the nozzle.

A seventh embodiment of the present invention is described hereinbelow.

Figure 14:
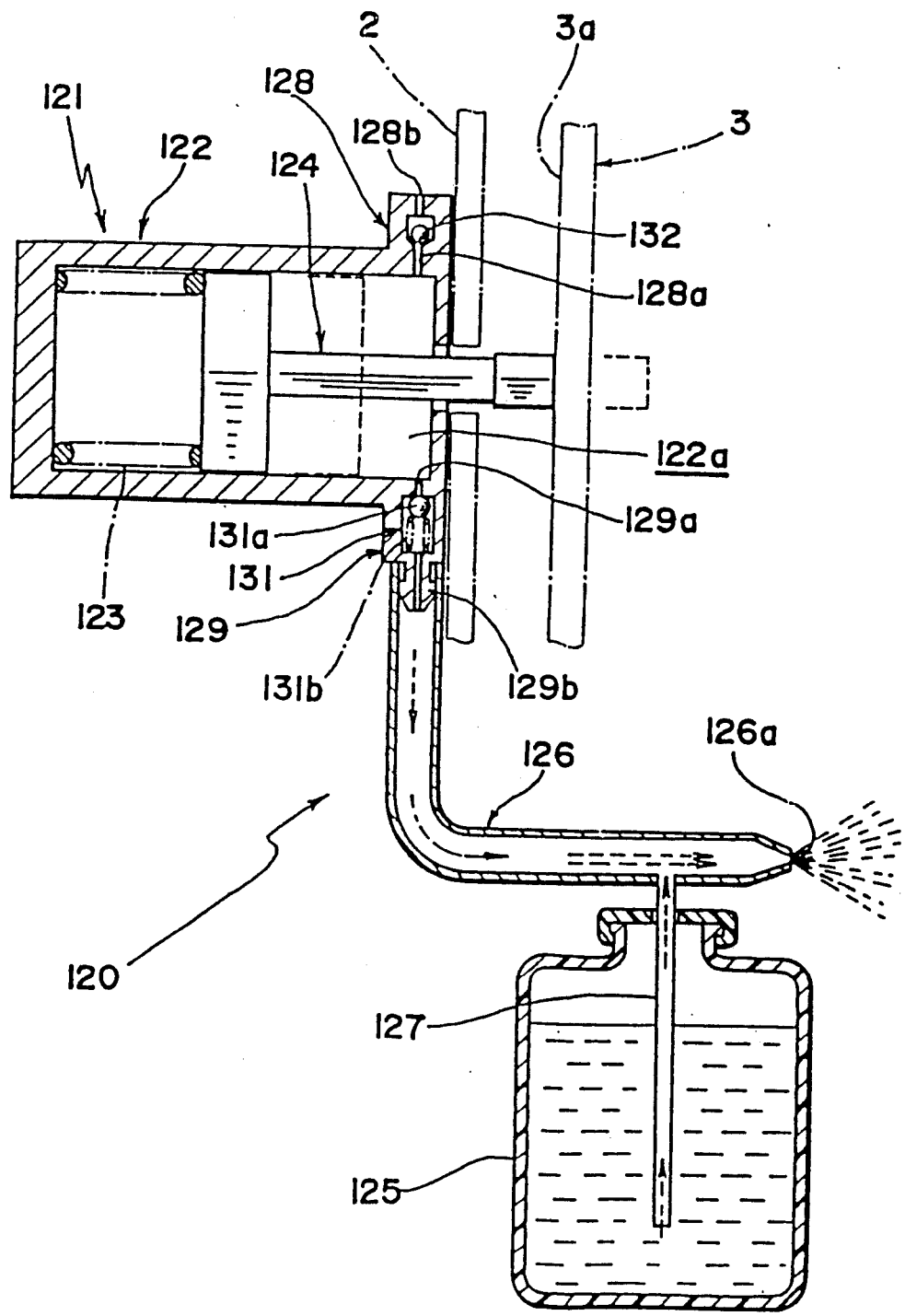
FIG. 14 is a vertical sectional view of a perfume emitting device according to a seventh embodiment of the present invention.

As shown in FIG. 14, a perfume emitting device 120 comprises a perfume atomizing unit 121 provided with a case 122 accommodating a spring 123 and a push rod 124 urged toward the door 3 by the spring 123, a tank 125 which stores a perfume, a tube 126 having one end connected to the case 122 and the other end provided with a nozzle portion 126a, and a pipe 127 having one end opening into the perfume contained in the tank 125 and the other end connected with the side face of the tube 126.

An air inlet portion 128 and an air discharge portion 129 are formed on the case 122 such that these two portions 128 and 129 are disposed in the vicinity of the instrument panel 2 when the case is mounted on the instrument panel 2. The air discharge portion 129 is provided with a check ball valve 131 comprising a ball 131a and a spring 131b. When the pressure in a chamber 122a of the case 122 increases, the ball 131a is pressed downward against the urging force of the spring 131b. As a result, the discharge opening 129a is opened. The end portion of the tube 126 opposite to the nozzle portion 126a is fitted into a connecting portion 129b of the air discharge portion 129. The air inlet portion 128 is provided with a ball valve 132 which introduces air through an inlet opening 128a when the pressure in the chamber 122a becomes lower than the atmospheric pressure and closes an opening 128b which communicates with the outside of the perfume atomizing unit 121 when the pressure in the chamber 122a is higher than the atmospheric pressure.

When the push rod 124 is moved backward as a result of the closing of the door 3, the pressure in the chamber 122a reduces with the increase of the volume thereof. As a result, air is introduced through the air inlet portion 128. In contrast, when the push rod 124 is moved forward as a result of the opening of the door 3, the air in the chamber 122a is pressurized with the decrease of the volume thereof, and consequently, the air is discharged from the air discharge portion 129 into the tube 126. Thus, the air is jetted out of the nozzle 126 toward the inside of the automobile. At this time, a negative pressure is generated in the tube 126 due to the presence of a flow of the discharged air. Accordingly, the perfume in the tank 125 is drawn through the pipe 127 and jetted out of the nozzle portion 126a together with the discharged air.

As described above, according to this embodiment, the perfume in the tank 125 is drawn into the tube 126 by making use of a negative pressure generated by the air which flows through the tube 126 when the door 3 is opened. As a result, the perfume is jetted out of the nozzle portion 126a together with air. Therefore, it is unnecessary to alter the volume of the chamber 122a in adjusting the amount of the perfume to be atomized. The amount of the perfume to be atomized can be adjusted by replacing the nozzle portion 126a. Accordingly, the amount of the perfume to be atomized can be easily adjusted, as compared with the case in which pressure is directly applied to the perfume introduced into the chamber. Further, as compared with the introduction of a liquid perfume, the force of the spring 123 which urges the push rod 124 can be set small because air is already introduced into the chamber 122a. Accordingly, the load to be imparted on a door trim can be reduced at the end face 3a of the door 3.

According to the above-described embodiments, the perfume is automatically emitted to the inside of the automobile in unison with the opening and closing of the door. However, if the perfume is too strong or if a driver does not want the perfume to be frequently emitted to the inside of the automobile in association with the opening and closing of the door, a perfume emitting device according to one of the following embodiments can be preferably employed in the automobile.

An eighth embodiment of the present invention is described hereinbelow with reference to FIGS. 15 to 19.

Figure 15:
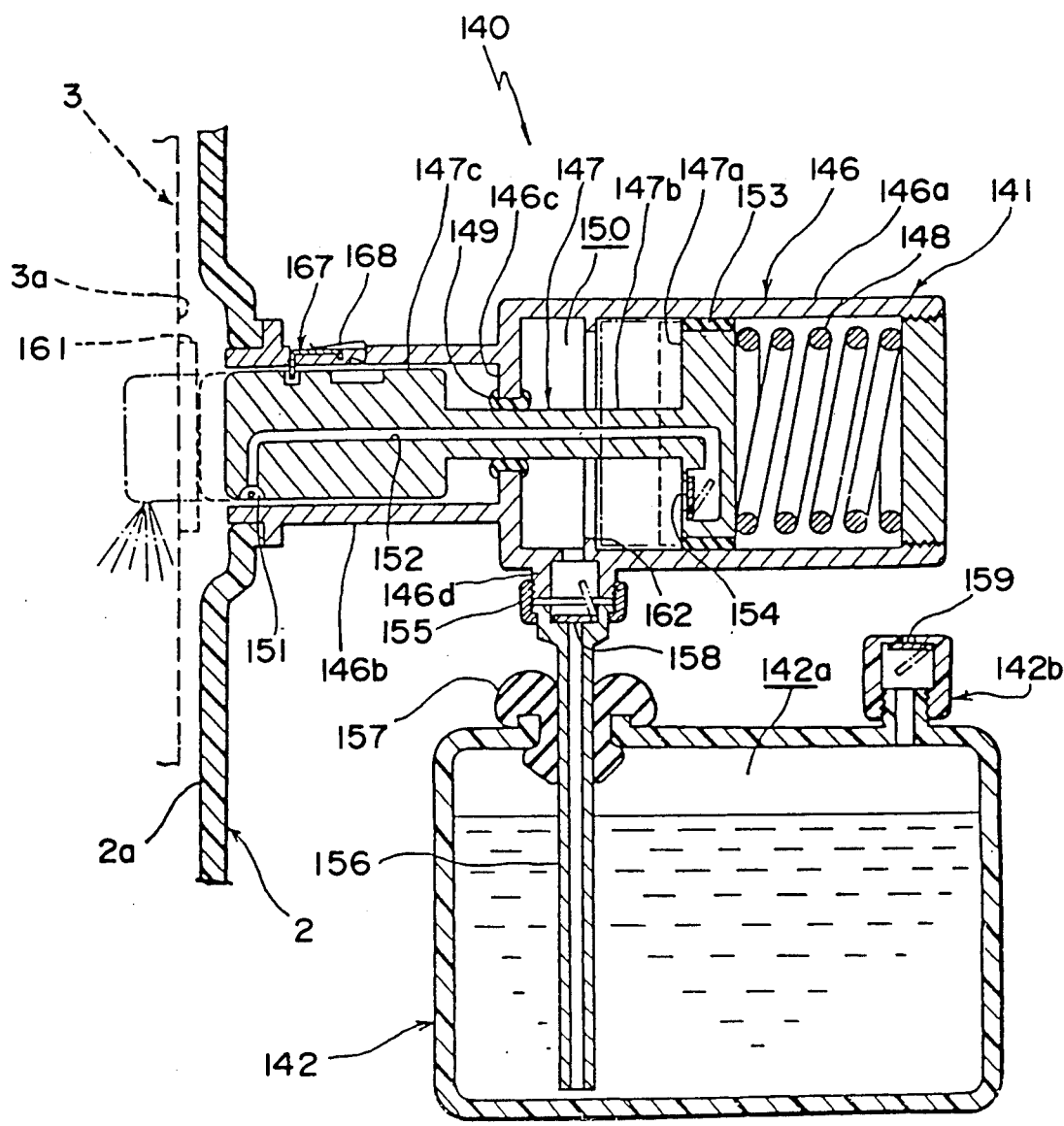
FIG. 15 is a vertical sectional view of a perfume emitting device according to an eighth embodiment of the present invention.

As shown in FIG. 15, a perfume emitting device 140 comprises a tank 142 disposed inside the instrument panel 2 and storing a liquid perfume and a perfume atomizing unit 141 mounted on the end face 2a of the instrument panel 2 and connected to the tank 142.

The perfume atomizing unit 141 comprises a stepped cylindrical case 146 having a main body 146a and a case mounting portion 146b extending from the main body 146a and a push rod 147 slidably disposed in the case 146. The case mounting portion 146b is fixed to the end face 2a of the instrument panel 2. The push rod 147 comprises a large diameter portion 147a accommodated in the main body 146a, a head portion 147c inserted through the case mounting portion 146b, and a shaft 147b connecting the head portion 147c and the large diameter portion 147a with each other. The push rod 147 is urged forward (on the door side) by a spring 148 mounted between the rear end portion (end portion opposite to the instrument panel) of the main body 146a and the large diameter portion 147a.

The case 146 is provided with an intermediate wall 146c which partitions the main body 146a from the case mounting portion 146b. The shaft 147b of the push rod 147 is slidably inserted through an opening formed in the intermediate wall 146c. The shaft 147b is provided with a duct 152 extending from a nozzle 151 which is open at the head portion 147c to the large diameter portion 147a. A terminal portion of the duct 152 opens into a chamber 150 defined by the main body 146a, the intermediate wall 146c, the large diameter portion 147a of the push rod 147, and the shaft 147b. The opening portion, namely, the terminal portion of the duct 152 is provided with a swing type check valve 154 (first check valve) which opens only when the pressure in the chamber 150 is higher than that in the duct 152. A sealing member 153 is mounted on the periphery of the large diameter portion 147a of the push rod 147. The space between the periphery of the large diameter portion 147a and the inner periphery of the main body 146a is sealed watertight.

A pipe connecting portion 146d having an opening to the chamber 150 is integrally formed with the main body 146a in the vicinity of the front portion thereof. A pipe 156 which terminates in the perfume stored in the tank 142 is fastened to the pipe connecting portion 146d by means of a joint member 155. The pipe 156 is inserted into the tank 142 through a sealing member 157. There is provided, on the upper portion of the pipe 156, a swing type second check valve 158 which opens only when the pressure in the space 142a defined above the level of the perfume in the tank 142 is higher than that in the chamber 150. The tank 142 is provided with an atmospheric pressure introducing portion 142b on an upper portion thereof. The pressure introducing portion 142b is provided with a swing type third check valve 159 which opens only when the pressure in the space 142a in the tank 142 is lower than the atmospheric pressure outside the tank 142.

The operation of the perfume emitting device 140 constructed as above is described hereinbelow.

When the door 3 is closed, as shown by the broken line in FIG. 15, a plate 161 fixed to the end face 3a of the door 3 contacts with the head portion 147c of the push rod 147. Thus, the door 3 presses the push rod 147 backward against the urging force of the spring 148 to such an extent that the head portion 147c thereof is located in the vicinity of the end face 2a of the instrument panel 2. Therefore, the pressure in the chamber 150 of the main body 146a is reduced with the increase of the volume of the chamber 150. As a result, the second check valve 158 is opened by the pressure in the space 142a in the tank 142 and the perfume is introduced into the chamber 150 through the pipe 156. Since the first check valve 154 is closed by the atmospheric pressure in the duct 152 at this time, no perfume is atomized from the nozzle 151.

When the door 3 is opened, the push rod 147 is slid toward the door 3 by the urging force of the spring 148. As a result, the large diameter portion 147a moves forward until it is brought into contact with a stopper 162 formed on the inner face of the main body 146a as shown by the dotted chain line in FIG. 15. At this time, the pressure in the chamber 150 increases with the reduction of the volume thereof. Consequently, the second check valve 158 is closed and the first check valve 154 is opened, with the result that the perfume in the chamber 150 is atomized from the nozzle 151. That is, when the door 3 is closed, the perfume which has been introduced into the chamber 150 is supplied to the inside of the automobile. The perfume emitting device emits this amount per opening of the door 3.

The nozzle 151 provided on the side face of the head portion 147c of the push rod 147 faces the inside of the automobile when the door 3 is opened.

When the door 3 is closed after the perfume is atomized as described above, the push rod 147 is moved backward. At this time, the pressure in the chamber 150 is returned to the initial condition with the increase of the volume thereof. As a result, the second check valve 158 is opened and the first check valve 154 is closed. Thus, the perfume atomization is stopped.

The perfume emitting device according to this embodiment is provided with a lock mechanism for locking the push rod 147, thereby preventing the spray unit 141 from being operated when a driver does not want the perfume to be emitted. The lock mechanism is described hereinbelow.

Figure 16:
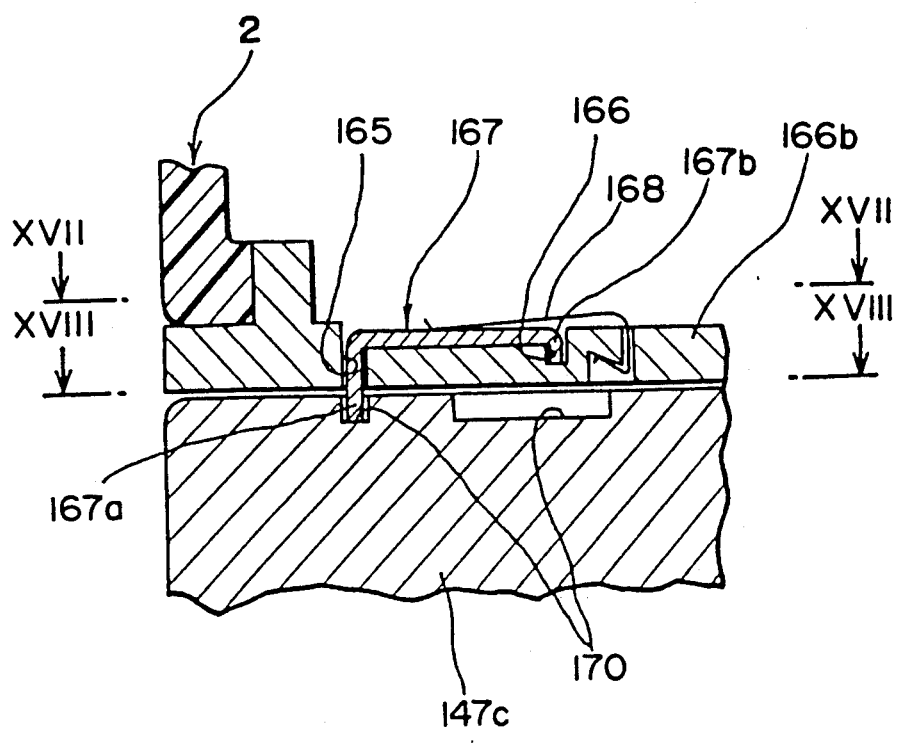
FIG. 16 is a vertical sectional view of a head portion of a push rod on which a lock mechanism of the perfume emitting device of FIG. 15 is provided.
Figure 17:
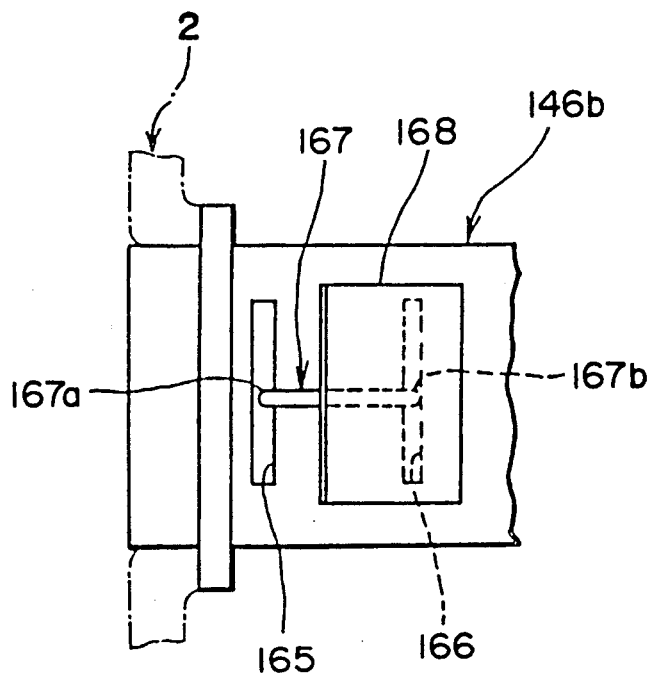
FIG. 17 is a view as viewed in the direction of arrows XVII—XVII in FIG. 16.

As shown in FIGS. 16 and 17, the side wall of the case mounting portion 146b which accommodates the head portion 147c of the push rod 147 is provided with a slit 165 and a groove 166 of a predetermined length, respectively disposed in parallel with each other along the circumferential direction of the case mounting portion 146b. Hooked opposite ends 167a and 167b of a pin 167 are in engagement with the slit 165 and the groove 166, respectively, so as to be movable along the circumferential direction of the case mounting portion 146b. The pin end 167a penetrates through the slit 165 and projects into the head portion 147c of the push rod 147. The pin 167 is urged toward the center of the case mounting portion 146b by a plate-shaped spring 168 so that the pin 167 will not fall out of the slit 165 or the groove 166. A cam groove 170 which will be described in detail later is formed on the periphery of the push rod 147. The pin end 167a is in engagement with the cam groove 170 so as to be movable in the cam groove 170.

Figure 18:
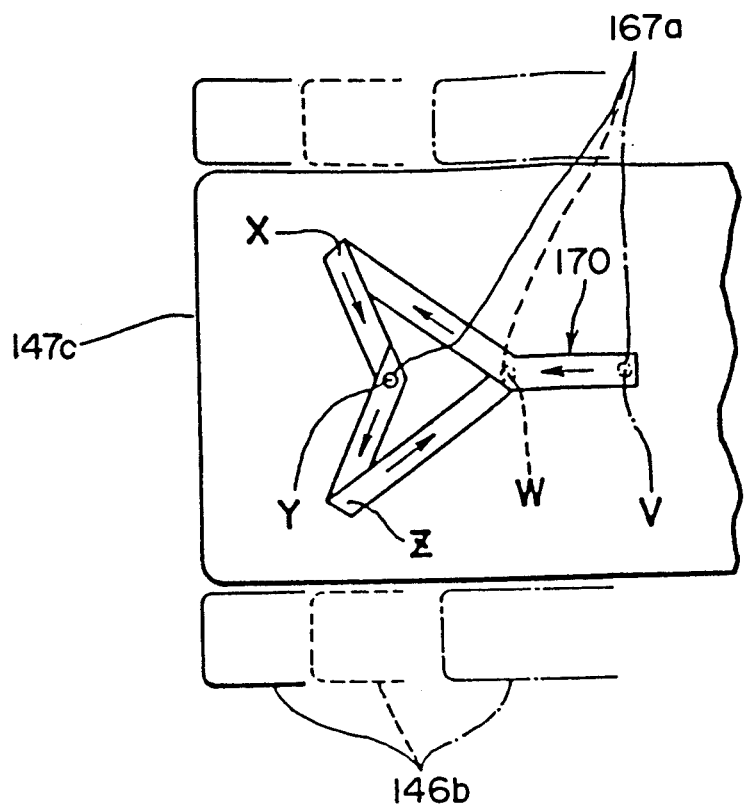
FIG. 18 is a view as viewed in the direction of arrows XVIII—XVIII in FIG. 16.
Figure 19:
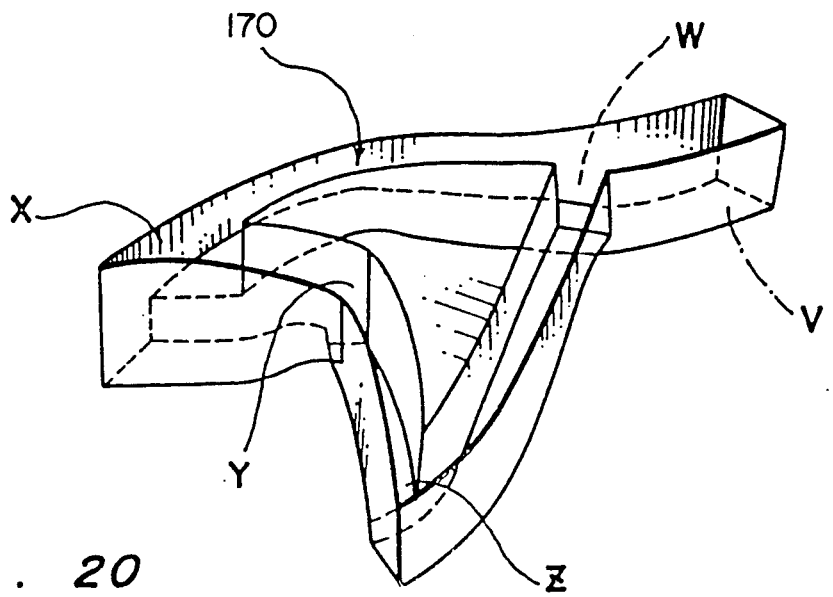
FIG. 19 is a perspective view of a heart-shaped cam groove formed in the lock mechanism of FIG. 16.

As shown in FIGS. 18 and 19, the cam groove 170 is formed substantially in the shape of a heart. A well-known push/push type lock mechanism can be constructed by the combination of the cam groove 170 and the pin end 167a.

The bottom of the cam groove 170 is flat between a point V and a point W, and sloped up at a certain angle from the point W to a point X, falls substantially perpendicularly at the point X, is sloped up toward a point Y, sloped up from the point Y toward a point Z, falls substantially perpendicularly at the point Z, is sloped up toward the point W, falls substantially perpendicularly, and finally reaches the point W.

Accordingly, when the pin end 167a moves in and along the cam groove 170, it always moves in the direction shown by the arrows in FIG. 18, thus repeating this cycle along the cam groove 170.

In this construction, when the head portion 147c of the push rod 147 moves forward (refer to FIG. 16 and the dotted chain lines in FIG. 18) as a result of the opening of the door 3, the pin head 167a is located at the point V in the cam groove 170. When the head portion 147c moves backward as a result of the closing of the door 3 (refer to FIG. 16 and the broken lines in FIG. 18), the pin head 167a moves toward the point W in and along the cam groove 170. That is, normally, every time the door 3 is opened and closed, the pin head 167a reciprocates between the points V and W.

When the head portion 147c is pressed one time toward the side opposite to the door (right side in FIG. 18) in the condition in which the pin head 167a is located either at the point W or V in the cam groove 170, the pin head 167a moves toward the point X along the cam groove 170. When the force for pressing the head portion 147c of the push rod 147 is released thereafter, the pin head 167a moves to the point Y along the cam groove 170 as the push rod 147 moves forward due to the urging force of the spring 148. Finally, the pin head 167a is stopped at the point Y. That is, as shown by the solid lines in FIGS. 16 and 18, the push rod 147 is locked in the condition in which it is moved backward further than the position at which it has been moved backward (refer to the broken lines in FIG. 18) by the operation for closing the door 3. Even though the door 3 is opened in the locked condition, the push rod 147 never moves forward. Accordingly, the perfume is not atomized from the perfume atomizing unit 141.

When the head portion 147c is pressed again toward the side opposite to the door 3 in the locked condition, the pin head 167a moves to the point Z along the cam groove 170. When the pressing force is released, the pin head 167a moves to the point W along the cam groove 170 with the forward movement of the push rod 147 due to the urging force of the spring 148. That is, the push rod 147 is unlocked, thus returning to the initial condition. Every time the head portion 147c is pressed one time toward the side opposite to the door 3 (i.e. is retracted), the cycle of locking/unlocking is repeated.

As described above, according to this embodiment, the push/push type lock mechanism comprising the heart-shaped cam groove 170 and the pin 167 is provided in the perfume emitting device 140 which is provided with the push rod 147 reciprocable with respect to the door 3 according to the operation for opening and closing the door 3. Normally, the perfume is automatically atomized to the inside of the automobile in unison with the operation for opening the door 3. However, the push rod 147 can be locked by the lock mechanism, so that the perfume atomizing unit 141 is rendered inoperative, by pressing the head portion 147c of the push rod 147 one time toward the side opposite to the door 3. Accordingly, if and when a driver does not want the perfume to be atomized to the inside of the automobile, he can stop the perfume from being atomized at his option so that he can be comfortable in the automobile.

In the above-described embodiment, although the push/push type lock mechanism comprises the heart-shaped cam groove 170 and the pin 167, a similar advantage can be obtained by providing a lock mechanism of any other type.

A ninth embodiment of the present invention is described hereinbelow.

Figure 20:
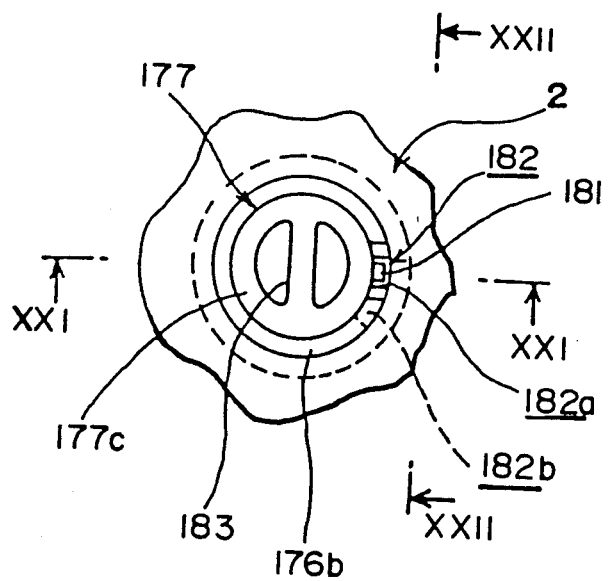
FIG. 20 is a side view of a perfume emitting device according to a ninth embodiment of the present invention.
Figure 21:
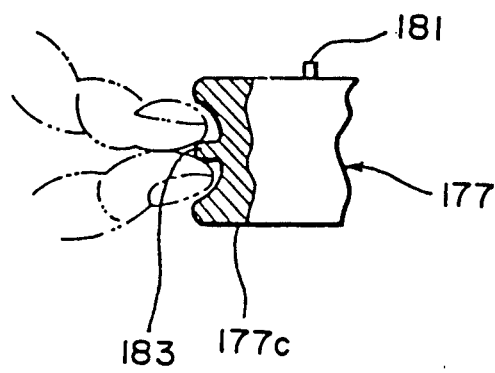
FIG. 21 is a partial section taken along the line XXI—XXI in FIG. 20.
Figure 22:
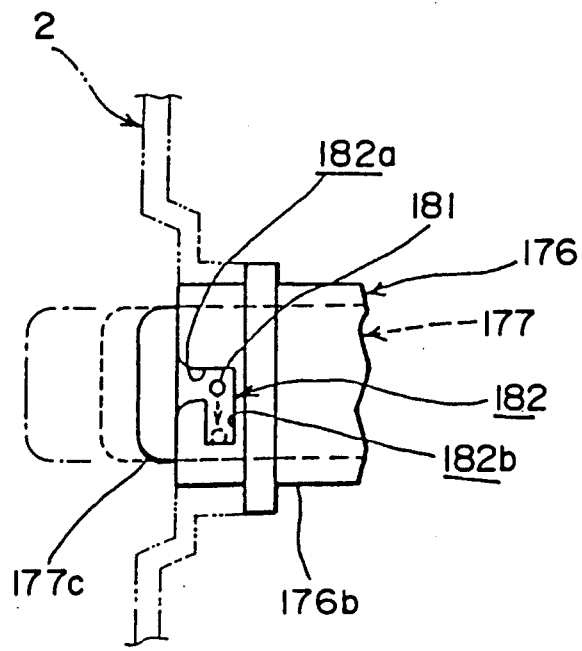
FIG. 22 is a view as viewed in the direction of arrows XXII—XXII in FIG. 20.

As shown in FIGS. 20 to 22, a pin-shaped projection 181, which is shorter than the thickness of the side wall of a mounting portion 176b of a case 176, is fixed to the side face of a head portion 177c of a push rod 177 in the vicinity of the front portion thereof. On the other hand, a substantially L-shaped lock groove 182 comprising a groove 182a formed in the axial direction of the case mounting portion 176b and a groove 182b formed in the circumferential direction thereof is formed in the side wall of the case mounting portion 176b in the vicinity of the front portion thereof. A knob 183 is formed on the front portion of the head portion 177c for rotation together therewith.

In the above-described construction, when the perfume atomizing unit is operated in unison with the operation for opening the door 3, the front-to-back moving position of the projection 181 is set so that the projection 181 can move forwardly of the lock groove 182. The push rod 177 can reciprocate with respect to the end face 3a of the door 3. When it is necessary that the perfume atomizing unit is required to be inoperative, the following operation must be carried out. The head portion 177c of the push rod 177 is rotated by means of the knob 183 for adjusting the position of the head portion 177c of the push rod 177 in the circumferential direction thereof so that the projection 181 can be brought into engagement with the groove 182a. Then, the knob 183 is pressed and rotated to rotate the head portion 177c toward the groove 182b, whereby the projection 181 is engaged with the groove 182b. Thus, the slide movement of the push rod 177 can be locked. The locked condition can be released by rotating the head portion 177c in the direction opposite to the above-described rotational direction.

A tenth embodiment is described hereinbelow, in which the perfume emitting device 69 according to the third embodiment of the present invention is provided with a lock lever 201 in the front portion 63b of the operation member 63. When the lock lever 201 is engaged with the head portion 63b of the operation member 63, the lock member 201 can keep the pressing portion 63a of the operation member 63 horizontal so that the spray unit 60 is inoperative.

Figure 24:
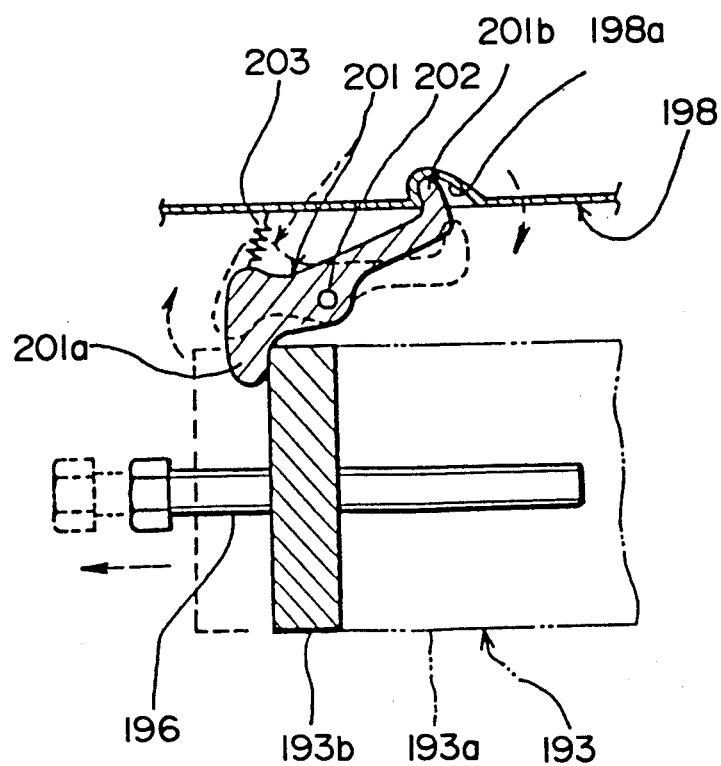
FIG. 24 is a section taken along the line XXIV—XXIV in FIG. 23.
Figure 23:
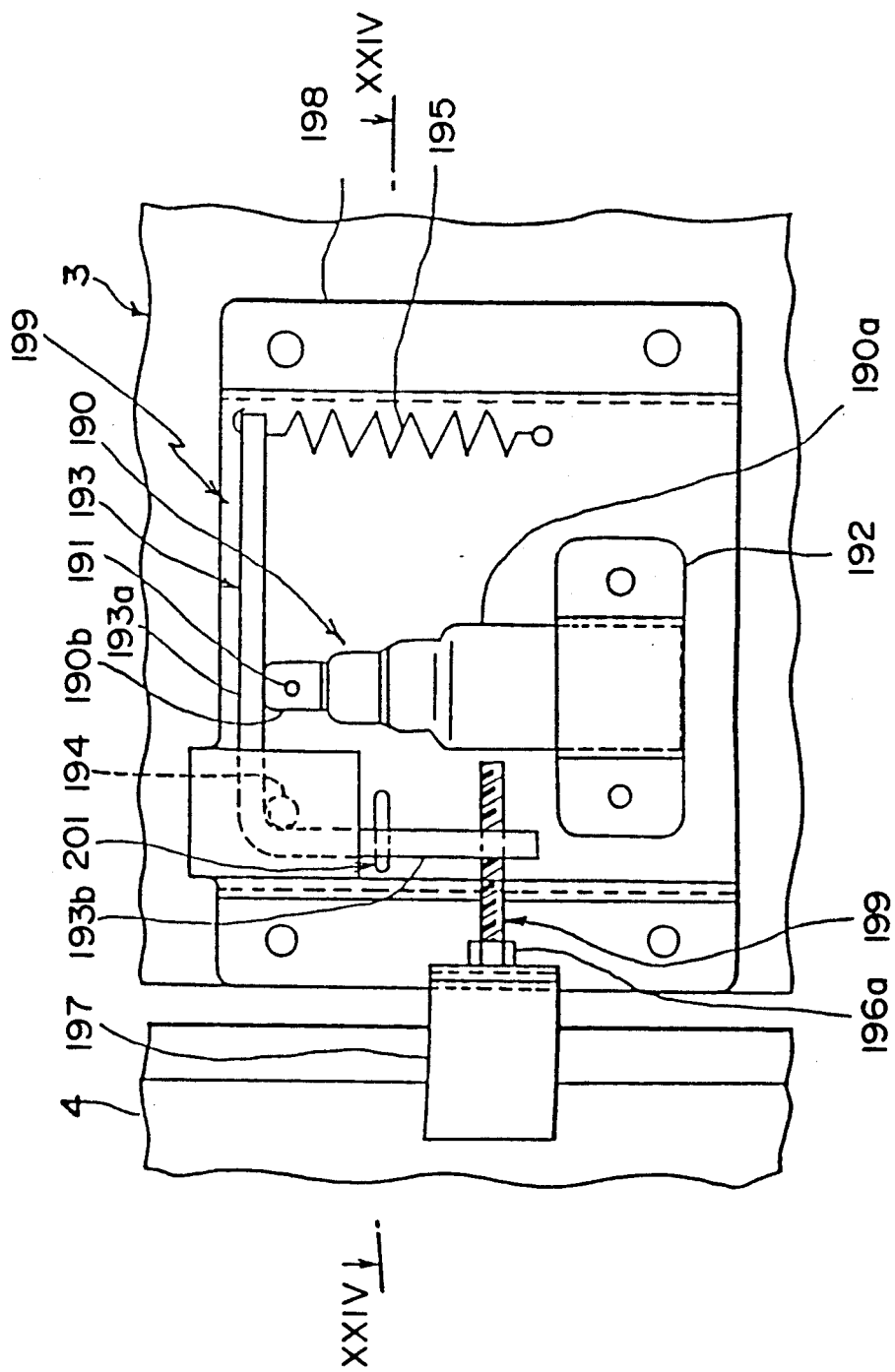
FIG. 23 is an elevational view of a perfume emitting device according to a tenth embodiment of the present invention.

That is, as shown in FIG. 24 in detail, the lock lever 20 is disposed between the mounting plate 68 and the front portion 63b of the operation member 63 so as to be pivotable about a shaft 202. The lock lever 201 has one end 201a for locking the front portion 63b of the operation member 63 and the other hooked end 201b which can be fitted in and locked by a concave portion 68a formed on the mounting plate 68. A tension spring 203 is fixed to the mounting plate 68 and one end 201a of the lock lever 201. The tension spring 203 applies a clockwise torque to the lock lever 201.

As shown by the broken line in FIG. 24, the lock lever 201 is normally located at an unlocking position due to the urging force of the spring 203. Therefore, the lock lever 201 does not interfere with the front portion 63a of the operation member 63 at this position. In order to keep the spray unit 60 inoperative, as shown by the solid line in FIG. 24, the lock lever 201 is rotated counterclockwise so that the hooked end 201b may be fitted in and locked by the concave portion 68a of the mounting plate 68. At this time, the end 201a of the lock lever 201 is brought into contact with the front portion 63b of the operation member 63 and prevents the operation member 63 from rotating. Accordingly, the pressing portion 63a of the operation member 63 is kept horizontal even though the door 3 is opened, and therefore, no perfume is atomized by the spray unit 60. The hooked end 201b can be disengaged from the concave portion 68a by rotating the lock lever 201 clockwise, i.e., the locked condition can be released. In other words, the operation member 63 can be locked or unlocked by rotating the lock lever 201.

In each of the eighth, ninth and tenth embodiments, although the perfume emitting device is provided with a lock means which is capable of locking an operation member for operating the perfume atomizing unit, the lock means may be replaced by an operation prohibiting means for prohibiting the perfume atomizing unit from being operated for a predetermined period of time after the perfume atomizing unit has been once operated.

If the perfume emitting device is provided with such an operation prohibiting means, repeated emission of the perfume is prohibited even when the door is repeatedly opened and closed during a short period of time. Accordingly, not only would the perfume never be wasted, but a driver is made comfortable in the automobile by assuring that the perfume is not too strong.

An eleventh embodiment of the present invention is discussed hereinbelow with reference to FIGS. 25 to 28.

Figure 25:
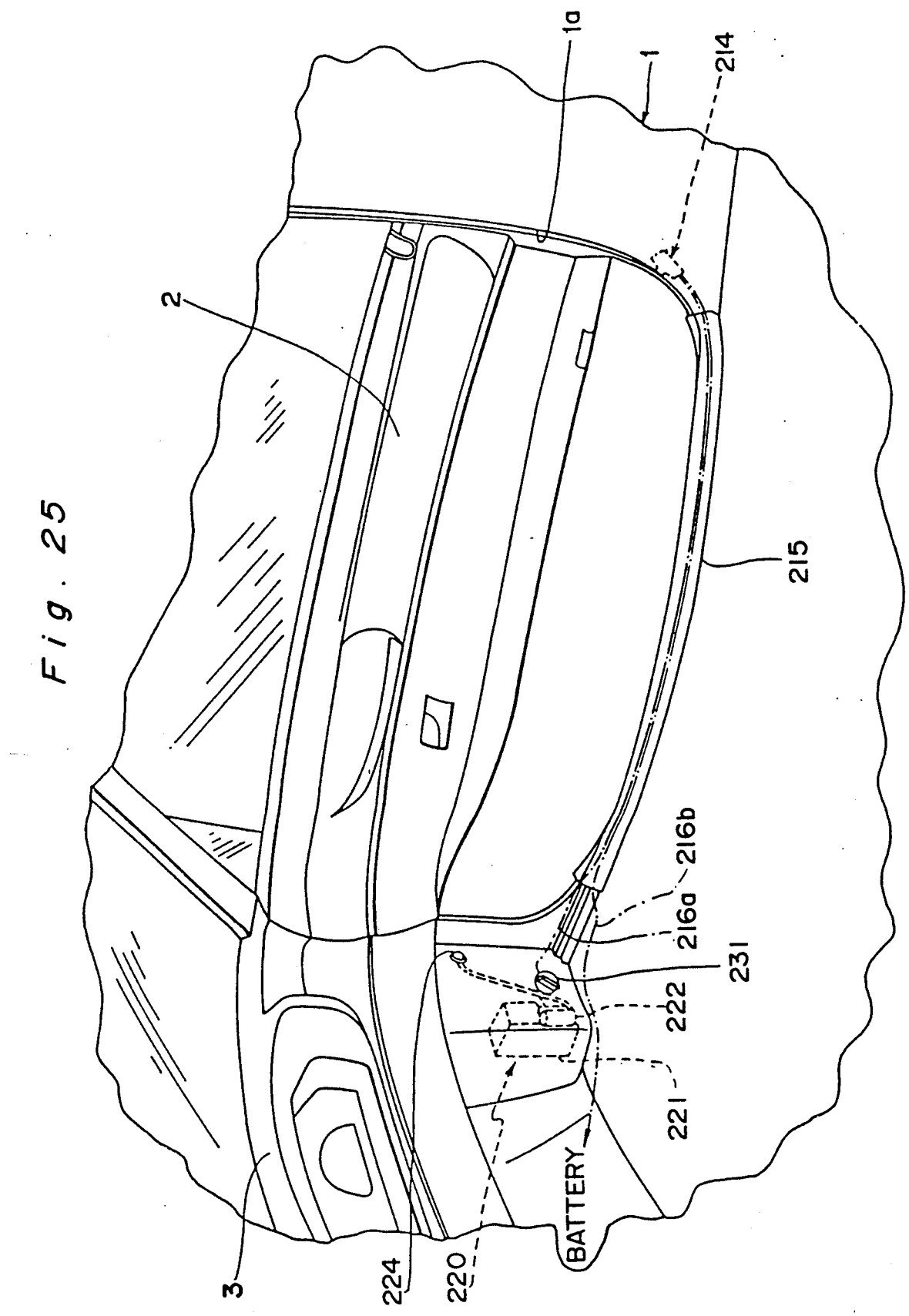
FIG. 25 is a perspective view of a door disposed on the side of a driver's seat of an automobile in which a perfume emitting device according to an eleventh embodiment of the present invention is mounted.

As shown in FIG. 25, a door switch 214 for detecting an operation for opening the door 2 is disposed at the lower rear portion of a door edge 1a of the automobile 1. The door switch 214 is connected to a perfume atomizing unit 220 disposed below the lower portion of an instrument panel 3 and a battery B (see FIG. 28) mounted on the automobile through harnesses 216a and 216b which penetrate through a duct disposed along the door edge 1a in the lower portion thereof.

The construction and operation of the door switch 214 are similar to known door switches. Therefore, detailed drawings and description of the inner construction of the door switch 214 are omitted.

Figure 26:
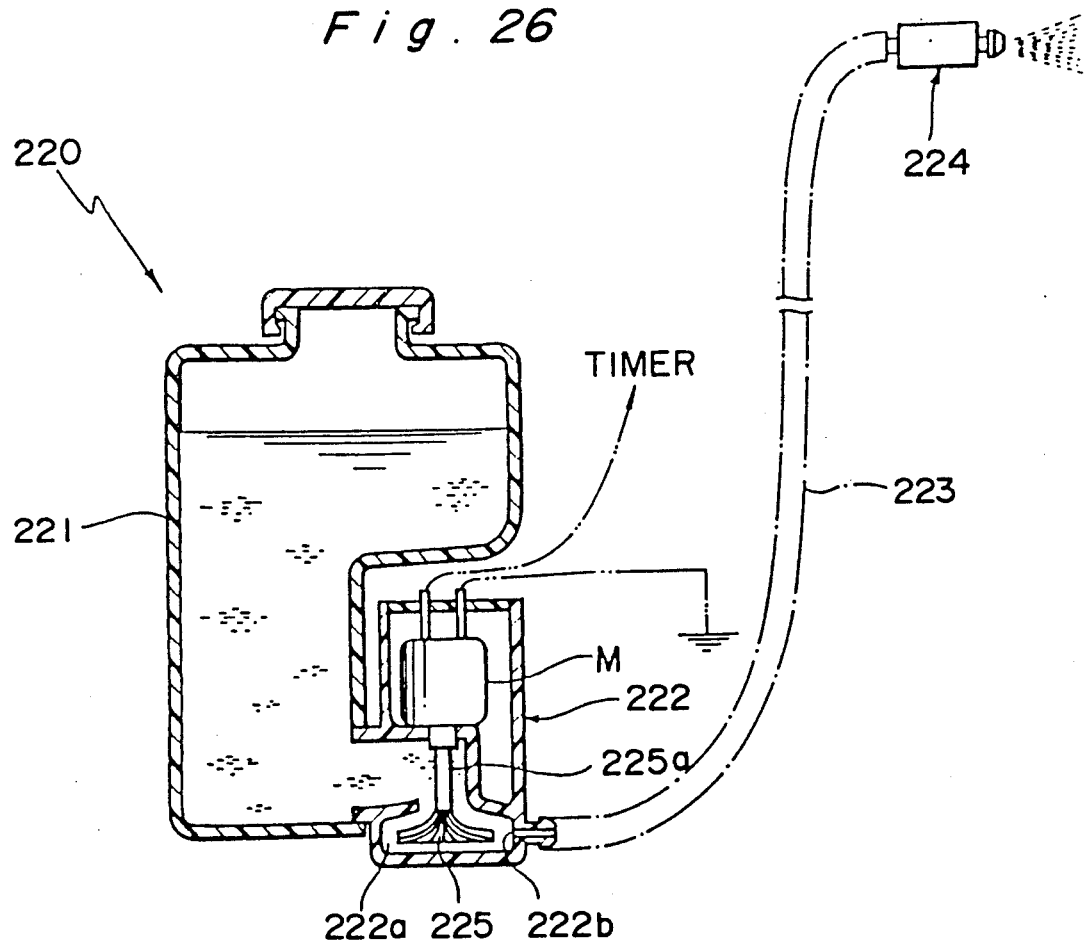
FIG. 26 is a vertical sectional view of the perfume emitting device according to the eleventh embodiment.

As shown in FIG. 26, the perfume atomizing unit 220 comprises a tank 221 for accommodating perfume, a pump 222 disposed below the tank 221 and provided with a pump chamber 222a which communicates with the tank 221, a flexible tube 223 connected to a pump discharge opening 222b which communicates with the pump chamber 222a, and a perfume atomizing nozzle 224 mounted on the top portion of the flexible tube 223. The pump 222 is disposed above the pump chamber 222a and provided with an electric motor M connected to a rotary shaft 225a of a fan 225 disposed in the pump chamber 222a. One end of the battery harness 216a is connected to the electric motor M so that the motor M may be operated for a predetermined period of time $T_1$ (for example, 1 to 5 seconds) which is counted by a timer 231. The timer 231 is actuated when the door switch 214 is turned on in response to the opening of the door 2. The operation of the timer 231 will be described in detail later.

Figure 27:
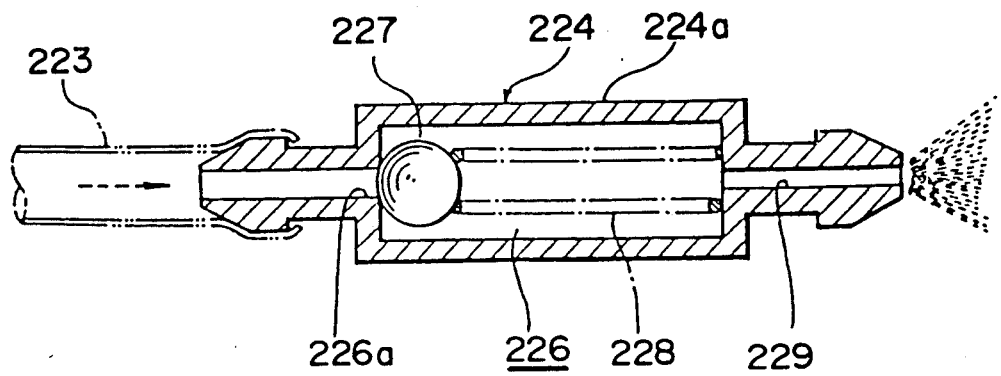
FIG. 27 is a vertical sectional view of a perfume atomizing nozzle of the perfume emitting device of FIG. 26.
Figure 28:
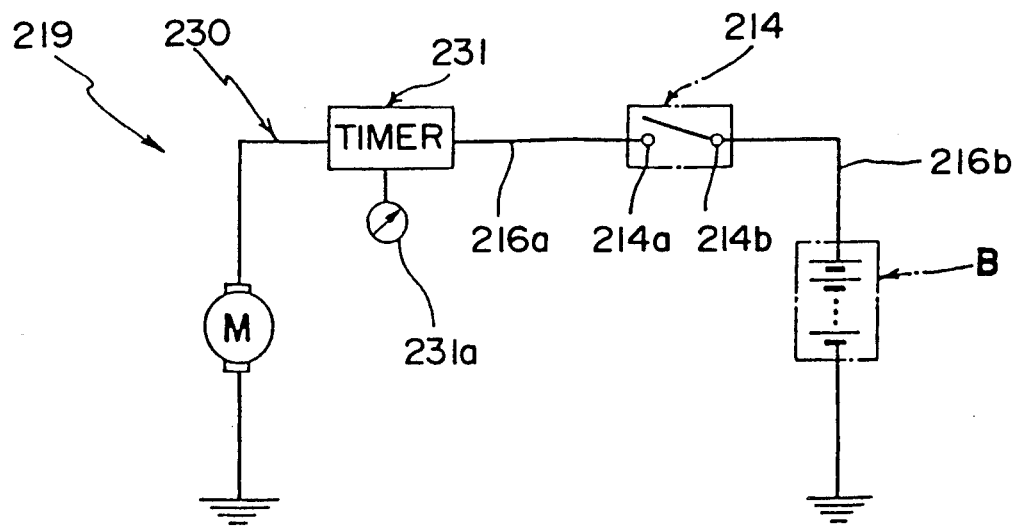
FIG. 28 is a circuit diagram of the perfume emitting device of FIG. 26.

As shown in detail in FIG. 27, the perfume atomizing nozzle 224 comprises a main body 224a and a chamber 226 for accommodating a valve body 227 in the form of a ball and a spring 228 which urges the valve body 227 toward an inlet port 226a. When the electric motor M is out of operation, the inlet port 226a is closed by the valve body 227 and no perfume is atomized. Upon operation of the electric motor M, the fan 225 is rotated and the perfume accommodated in the pump chamber 222a is pressurized. The pressurized perfume is fed to the nozzle 224 through the flexible tube 223. As a result, the valve body 227 is moved toward a duct 229 against the urging force of the spring 228 and the perfume is jetted out of the nozzle 224 through the duct 229.

In this embodiment, the timer 231 is provided in order to prevent the perfume atomizing unit 220 from being operated for a predetermined period of time after the perfume atomizing unit 220 has been once operated. Accordingly, the perfume will never be wasted since repeated operation of the perfume atomizing unit 220, which occurs whenever the door 2 is repeatedly opened and closed for a short period of time will not occur.

The timer 231 is disposed between the door switch 214 and the perfume atomizing unit 220. As shown in detail in the schematic electrical circuit diagram of FIG. 28, the timer 231 is connected to a switch contact 214a of the door switch 214 and the electric motor M which drives the pump 222 of the perfume atomizing unit 220. The timer 231 is actuated when the door switch 214 is turned on and electricity flows through a motor driving circuit 230 for a predetermined period of time $T_1$, and thereafter, no electricity flows through the motor driving circuit 230 for a predetermined period of time $T_2$, which can be set within the range, for example, of 1 to 30 minutes by adjusting an operation time setting dial 231a of the timer 231.

The operation of the perfume emitting device 219 as constructed as above is described hereinbelow.

After the atomization has taken place for the predetermined period of time $T_1$, when the timer 231 is in its initial condition (i.e. the timer 231 is not operating because the predetermined period of time $T_2$ has elapsed) and the door 2 is not opened (i.e. the door switch 214 is off), electricity does not flow through the motor driving circuit 230 connecting the battery B, which is mounted on the automobile and connected to the switch contact 214b, with the electric motor M. Therefore, the electric motor M is not operated.

When the door 2 is opened in this initial condition, the door switch 214 detects such opening and is turned on. Accordingly, the switch contacts 214a and 214b are connected to each other and the timer 231 is actuated. As a result, electricity flows through the motor driving circuit 230 for the predetermined period of time $T_1$ and the electric motor M starts running. Thus, a first perfume atomizing operation is performed by the perfume atomizing unit 230. After atomization takes place for the predetermined period of time $T_1$, electricity will not flows through the motor driving circuit 230 during the period of time $T_2$. Accordingly, even when the door 2 is opened and the door switch 214 is turned on, the perfume atomizing unit 220 is out of operation during the period of time $T_2$ in which the timer 231 is actuated.

After the lapse of the period of time $T_2$, the timer 231 stops its operation, thus returning to the initial condition. When the door switch 214 is again turned on, a first perfume atomizing operation is effected for the period of time $T_1$. Thereafter, the same operation cycle can be repeated.

Supposing that the door 2 is repeatedly opened and closed during a short period of time, the perfume will be automatically atomized to the inside of the automobile in unison with the first operation for opening the door 2. Thereafter, the perfume atomizing unit 220 is not operated during the period of time $T_2$ even if the door 2 is repeatedly opened. Thus, the perfume is not wasted and the perfume scent in the automobile is prevented from becoming too strong. Accordingly, the driver feels comfortable in the automobile.

Further, the perfume emitting device 219 according to this embodiment is capable of complying with various users' demands because the operation period of the timer 231 can be set as desired.

In the above-described embodiment, the timer 231 is a hardware element. With the timer 231, the perfume atomizing unit 220 can be rendered inoperative during the period of time $T_2$ so as to prevent the perfume from being repeatedly atomized during a short period of time. However, a similar operation can be performed by employing software, for example, a microcomputer mounted in the automobile.

A twelfth embodiment of the present invention is described hereinbelow.

Figure 29:
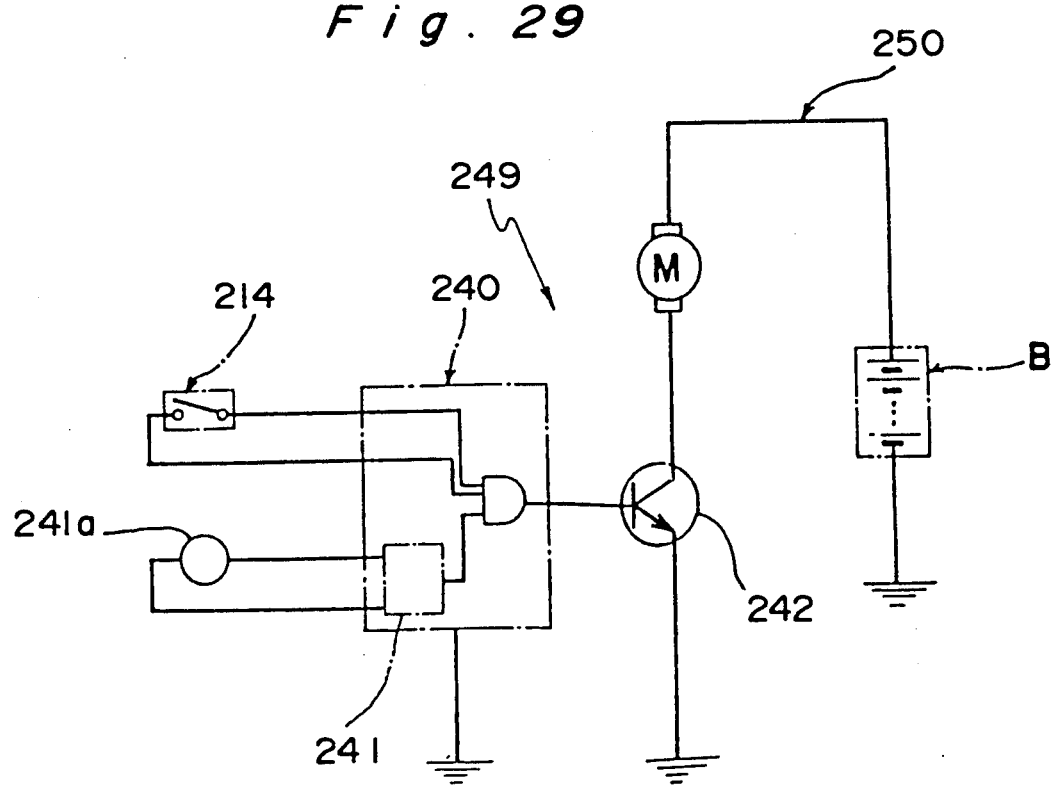
FIG. 29 is a circuit diagram of a perfume emitting device according to a twelfth embodiment of the present invention.

As shown in FIG. 29, the door switch 214 is connected to a control unit 240 mounted in the automobile and primarily comprised of a microcomputer. A time setting dial 241a for setting the predetermined period of time $T_2$, in which the perfume atomizing unit 220 is kept inoperative, is connected to a timer circuit 241 provided in the control unit 240. The timer circuit 241 is actuated when the door switch 214 is turned on. Upon completion of the counting of the predetermined period of time $T_1$, the timer circuit 241 terminates the counting of time when the predetermined period of time $T_2$ set by the time setting dial 241a has elapsed.

One of the terminals of the electric motor M of the perfume atomizing unit 220 is connected to the battery B and the other terminal is connected to the control unit 240 through a transistor 242 which controls ON/OFF of electric current which flows through a motor driving circuit 250 for driving the electric motor M. The operation of the transistor 242 is controlled by a signal transmitted thereto from the microcomputer. That is, the transistor 242 operates for the predetermined period of time $T_1$ upon actuation of the timer circuit 241. During this period of time, electricity flows through the motor driving circuit 250 and the electric motor M is driven so that the perfume atomizing unit 220 can perform a perfume atomizing operation. Upon lapse of this period of time $T_1$, the transistor 242 does not operate, i.e. electricity does not flow through the motor driving circuit 250, until the period of time $T_2$ elapses.

The operation of the perfume emitting device 249 constructed as described above is described hereinbelow with reference to a flowchart shown in FIG. 30.

First, a key plate (not shown) for locking/unlocking the door 2 is inserted into a keyway of the door 2 and rotated in the unlocking direction so that the system can be started. At the time of starting of the system, the timer circuit 241 is still out of operation and the system is maintained in the initial condition.

When the door 2 is opened in this condition, the door switch 214 is turned on at step #1 followed by step #2 at which the timer circuit 241 is actuated. Simultaneously, the electric motor M is driven at step #3 and the perfume atomizing unit 220 atomizes the perfume. The time (t) elapsed is counted from a point (t=0) at which the timer circuit 241 initiates its operation (step #2). It is judged at step #4 whether or not the time (t)

elapsed reaches the predetermined period of time $T_1$ after the electric motor M has been driven, i.e., after the timer circuit 241 has been turned on. If, at step #4, it is determined that the predetermined period of time $T_1$ has not elapsed, the electric motor M remains in operation and the perfume atomizing operation continues. The judgment at step #4 is repeatedly conducted until the time (t) reaches the period of time $T_1$, i.e. judgment at step #4 is YES. When the time (t) does reach $T_1$, the operation of the transistor 242 is stopped by a signal sent from the microcomputer. At this time ($t=T_1$), electricity stops flowing through the motor driving circuit 250 and, consequently, the electric motor M is stopped at step #5. Thus, the perfume atomizing operation is terminated.

At step #6, it is determined whether or not the time (t) has reached the predetermined period of time $T_2$ after the predetermined period of time $T_1$ has elapsed. If the judgment is NO, the timer circuit 241 continues its operation and step #6 is repeatedly conducted. When the time (t) reaches a period of time ($T_1+T_2$), that is, when the judgment at step #6 is YES, the operation of the timer circuit 241 is stopped at step #7. Thereafter, the circuit returns to its initial condition and the same operation cycle can be repeated.

Figure 30:
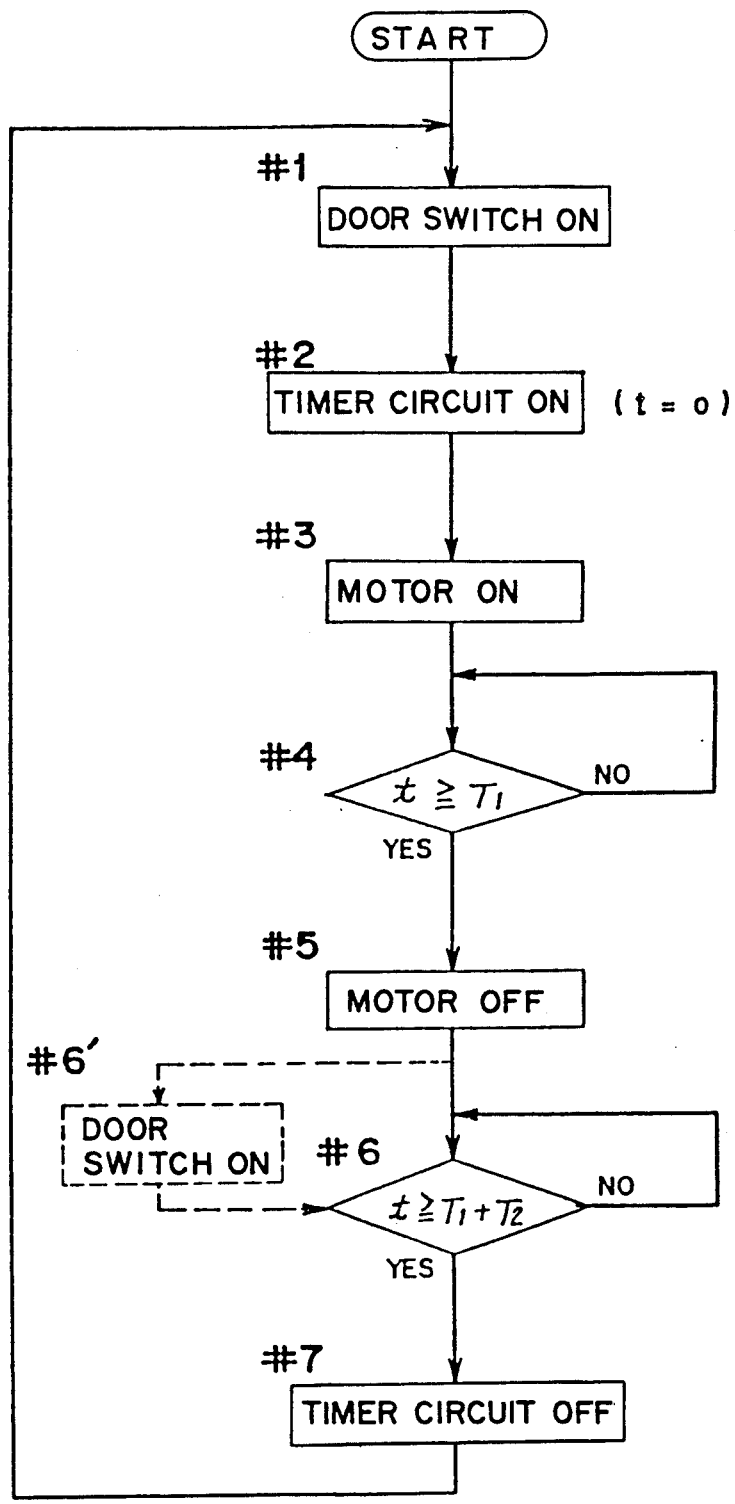
FIG. 30 is a flowchart showing the operation of the perfume emitting device according to the twelfth embodiment.

When the door 2 is opened during the operation of the timer circuit 241 in the above-described operation cycle i.e., when the door switch 214 is turned on at step #6' as shown by the broken line in FIG. 30, electricity still does not flow through the motor driving circuit 250 because the timer circuit 241 is in operation and counting the predetermined period of time $T_2$. Accordingly, the perfume atomizing unit 220 does not perform a perfume atomizing operation.

A thirteenth embodiment of the present invention is described hereinbelow with reference to FIGS. 31 to 36.

In this embodiment, a perfume is automatically emitted to the inside of an automobile in unison with an operation for opening a door only when a driver gets into the automobile.

Figure 36:
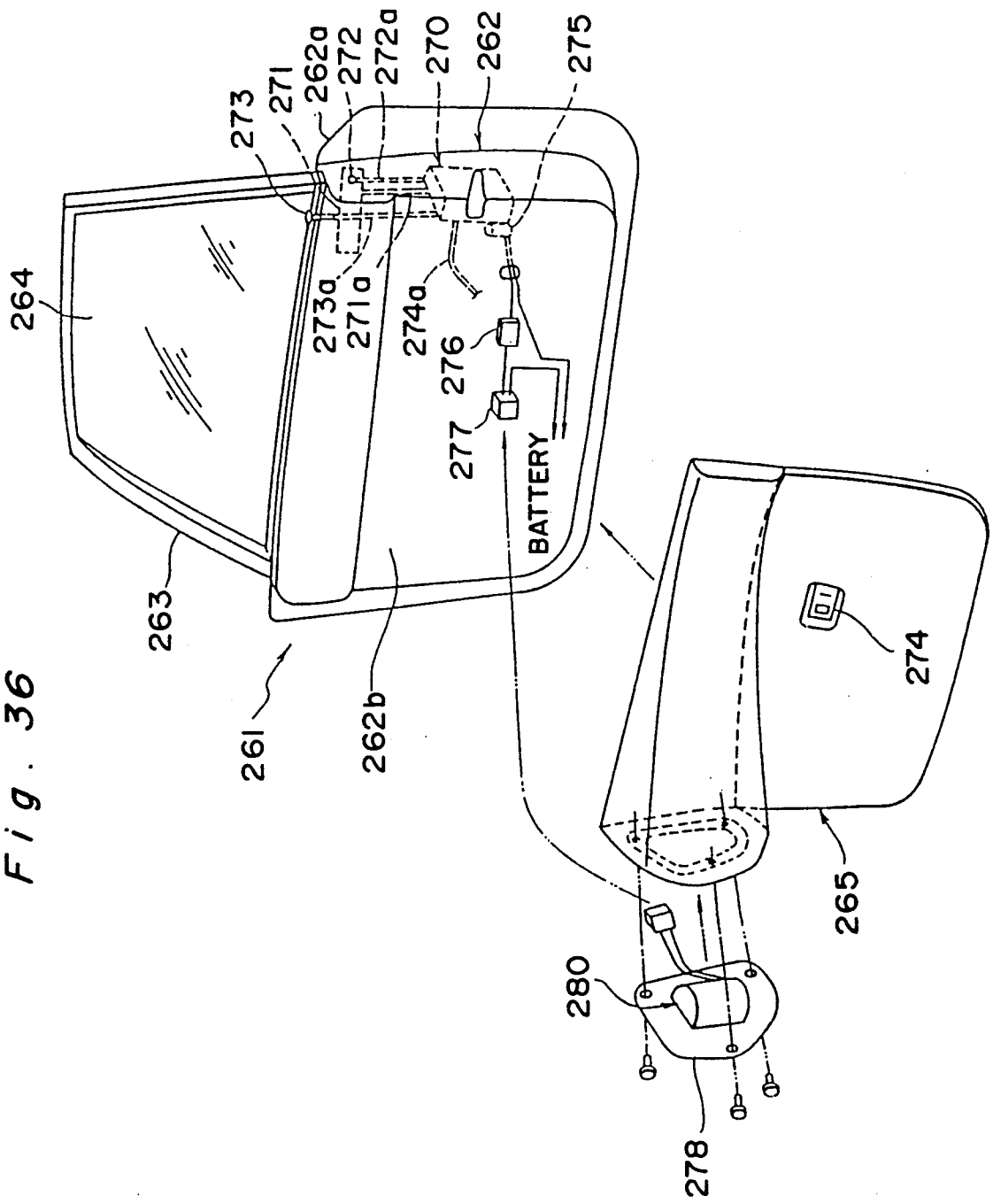
FIG. 36 is an exploded perspective view of a door of the automobile in which the perfume emitting device according to the thirteenth embodiment is mounted.

As shown in FIG. 36, a door 261 of an automobile, to which the present invention according to this embodiment is applied, comprises a door body 262 including a door outer panel 262a and a door inner panel 262b, a door frame 263 provided above the door body 262, a door glass 264 supported by the door frame 263 and the door body 262, and a door trim 265 mounted on the door inner panel 262b and forming the inner portion of the door body 262.

A door lock device 270 capable of locking the door 261 is disposed in a closed space between the outer and inner panels 262a and 262b of the door body 262. The door outer panel 262a is provided with a door outer handle 271 for opening the door 261 from the outside of the automobile and a key cylinder 272 mounted beside the door outer handle 271 for locking the door lock device 270. A door lock knob 273 for for locking the door lock device 270 from the inside of the automobile is provided above the door inner panel 262b.

The door trim 265 is provided with a door inner handle 274 for opening the door 261 from the inside of the automobile. The door outer handle 271, the key cylinder 272, the door lock knob 273, and the door inner handle 274 are connected to the door lock device 270 via an outer handle rod 271a, a key cylinder rod 272a, a knob rod 273a, and an inner handle rod 274a, respectively.

The door lock device 270 is provided with a lock interlocking switch 275 connected to one terminal of a coupler 277 and to a battery (not shown) mounted on the automobile. The detail of the lock interlocking switch 275 will be described later. The other terminal of the coupler 277 is connected to the battery.

Figure 35:
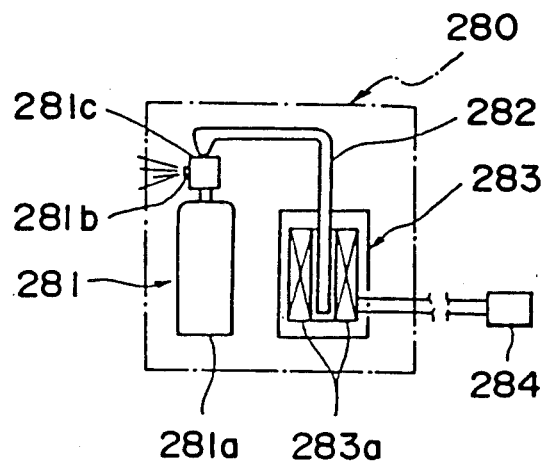
FIG. 35 is an elevational view of a perfume atomizing unit of the perfume emitting device according to the thirteenth embodiment.

A perfume atomizing unit 280 for atomizing perfume into the automobile is disposed in a space defined in the interior of the door trim 265 through a mounting plate 278. As shown in FIG. 35, the perfume atomizing unit 280 comprises a spray unit 281 including a main body 281a for storing liquid perfume and a head portion 281c provided with a nozzle 281b for atomizing the perfume, a substantially L-shaped rod 282 which presses the head 281c portion of the spray unit 281 toward the main body 281a so as to allow the spray unit 281 to spray the perfume, and an electromagnetic solenoid 283 for moving the rod 282 up and down. A coil 283a of the electromagnetic solenoid 283 is connected with a coupler 284 which is further connected with the coupler 277.

When the lock interlocking switch 275 is turned on in the above-described construction, electricity is supplied from the battery to the electromagnetic solenoid 283 for a fixed period of time set by a timer 276. As a result, the coil 283a is energized and the rod 282 is moved downward. Then, the head portion 281c of the spray unit 281 is pressed toward the main body 281a and the spray unit 281 atomizes the perfume from the nozzle 281b. When the lock interlocking switch 275 is turned off or when the fixed period of time elapses, no electricity is supplied to the electromagnetic solenoid 283. As a result, the rod 282 is moved upward and the spray unit 281 stops the spraying operation. In other words, when the lock interlocking switch 275 is turned on, the perfume atomizing unit 280 atomizes the perfume to the inside of the automobile for the fixed period of time set by the timer 276.

Although the spray unit 281 is employed as perfume emitting means in the above-described embodiment, an electric heater may be arranged in liquid perfume stored in a container to heat and evaporate the perfume so that the perfume may be emitted to the inside of the automobile.

In this embodiment, the perfume is atomized to the inside of the automobile only upon opening of the door 261 from the outside of the automobile (or at least operation of the door outer handle 271) when a driver gets into the automobile. Thereafter, the perfume is prevented from being wasted by opening the door from the inside of the automobile. To this end, the lock interlocking switch 275 is turned on only when the door lock device 270 is unlocked and an operation for opening the door 261 is performed by the door outer handle 271.

The lock interlocking switch 275 and the door lock device 270 are described hereinbelow.

Figure 31:
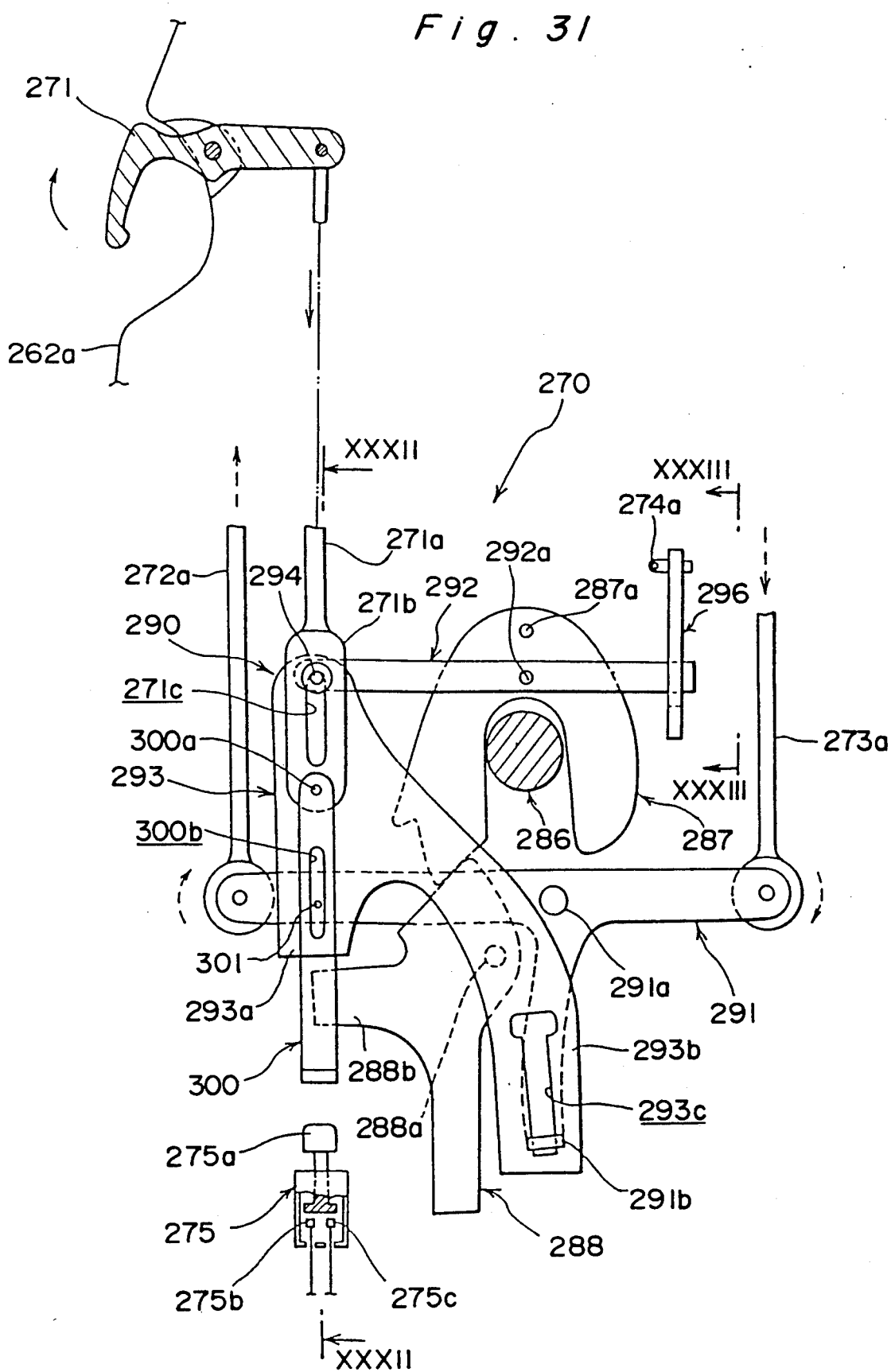
FIG. 31 is an elevational view schematically showing the internal construction of a door lock device of an automobile in which a perfume emitting device according to a thirteenth embodiment of the present invention is mounted.

FIG. 31 schematically depicts the inner structure of the door lock device 270 according to this embodiment. As shown in FIG. 31 which indicates the unlocked condition of the door lock device 270, the door lock device 270 comprises a substantially U-shaped latch 287 which engages with a lock striker 286 fixed to the automobile body and a latch operating member 288 capable of engaging with the latch 287. The latch operating member 288 and the latch 287 are pivotally supported by support shafts 288a and 287a, respectively. The latch 287 is urged by a tension spring (not shown) in the direction counterclockwise as viewed in FIG. 31. Therefore, when the locked condition shown in FIG.

31, in which a tapered portion formed at the lower portion of the latch 287 and a tapered portion formed at the upper portion of the latch operating member 288 engage with each other, is released, the latch 287 pivots approximately 90 degrees counterclockwise. As a result, the latch 287 disengages from the lock striker 286 when the door is opened.

The door lock device 270 is provided with a lock assembly 290 which comprises a substantially T-shaped lever 291 pivotally supported by a shaft 291a, a straight lever 292 disposed above the T-shaped lever 291 and pivotally supported by a shaft 292a, and a plate member 293 having a pressing portion 293a which confronts and is disposed above the arm 288b of the latch operating member 288 and an engaging portion 293b which engages with the T-shaped lever 291. Lower portions of the key cylinder rod 272a and the knob rod 273a are pivotally mounted on opposite end portions of the T-shaped lever 291.

Figure 32:
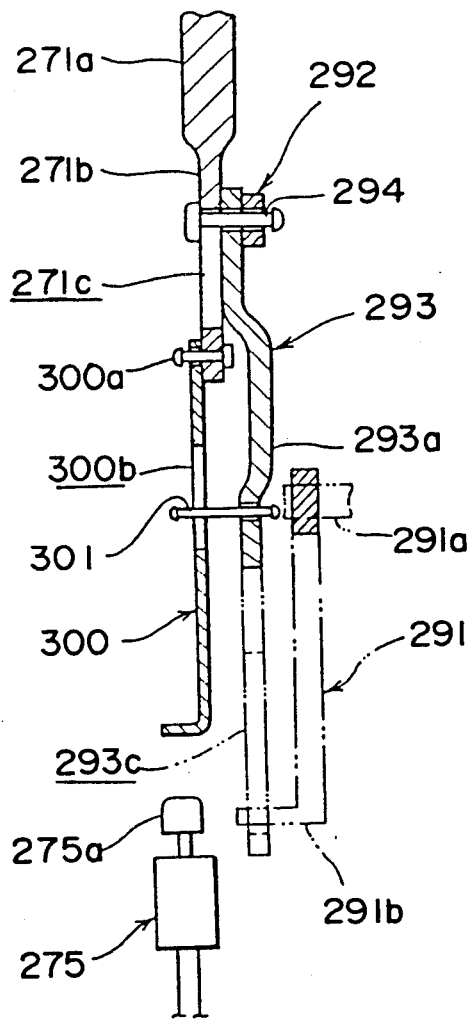
FIG. 32 is a section taken along the line XXXII—XXXII in FIG. 31.
Figure 33:
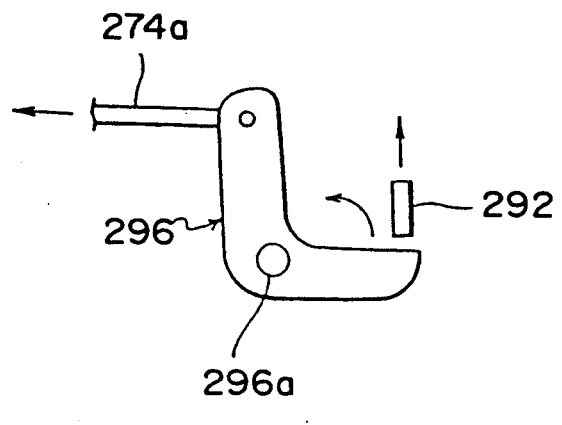
FIG. 33 is a view as viewed in the direction of arrows XXXIII—XXXIII in FIG. 31.

As shown in FIG. 32, the left end portion of the straight lever 292 and (as shown in FIG. 31) the upper portion of the plate member 293 are pivotally mounted on the upper portion of a mounting portion 271b provided at the lower portion of the outer handle rod 271a by means of a pin 294 inserted in a slot 271c formed in the outer handle rod mounting portion 271b. As shown in FIG. 33, an L-shaped inner lock lever 296 pivotally supported by a shaft 296a and operated by the inner handle rod 274a is provided in the vicinity of the end portion of the straight lever 292 on the side opposite to the lock assembly 290 (right side in FIG. 31).

When the door lock device 270 is kept unlocked as shown in FIG. 31 and when the door inner handle 274 is operated so that the inner handle rod 274a is pulled leftward as viewed in FIG. 33, the inner lock lever 296 pivots counterclockwise about the shaft 296a and the right end portion of the straight lever 292 is moved upward as shown by an arrow in FIG. 33. As a result, the straight lever 292 pivots counterclockwise about the shaft 292a, and the pin 294 disposed on the left end portion of the straight lever 292 slides downward in the slot 271c of the outer handle rod mounting portion 271b. Consequently, the plate member 293 moves downward and the pressing portion 293a presses the arm 288b of the latch operating member 288 downward, with the result that the latch operating member 288 pivots counterclockwise about the shaft 288a and the tapered portion formed at the lower portion of the latch 287 disengages from the tapered portion formed at the upper portion of the latch operating member 288. Thus, the latch 287 is caused to pivot 90 degrees by the urging force of a spring (not shown). Accordingly, the latch 287 is unlocked, and consequently, the latch 287 disengages from the lock striker 286 by opening the door 261.

As shown by a solid arrow in FIG. 31, when the door outer handle 271 is operated, the outer handle rod 271a is also pressed downward. As a result, the plate member 293 is moved downward and the locked condition is released as it was upon operation of the door inner handle 274. Thus, the door 1 can be opened.

A longitudinally elongated guide groove 293c is formed in the vicinity of the lower end portion of the engaging portion 293b of the plate member 293. A projection 291b formed at the lower end portion of the T-shaped lever 291 is fitted into the guide groove 293c.

Figure 34:
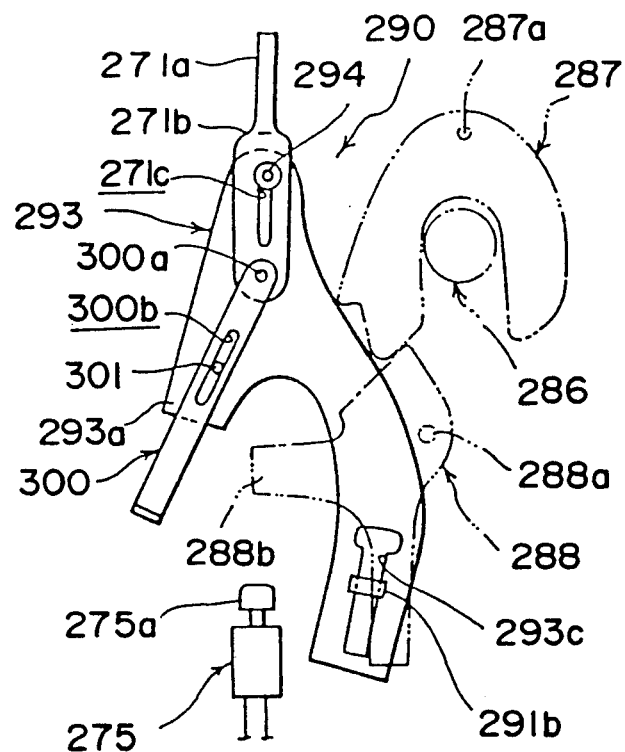
FIG. 34 is an elevational view of a lock assembly in a locked condition of the door lock device of FIG. 31.

As shown by a broken arrow in FIG. 31, the key cylinder rod 272a is moved upward by rotating the key cylinder 272 in the locking direction by means of a key plate (not shown). The knob rod 273a is pressed downward by pressing the door lock knob 273 downward and locking it. Accordingly, when a locking operation is performed by the key cylinder 272 or the door lock knob 273, the T-shaped lever 291 pivots about the shaft 291a and tilts. At this time, the guide groove 293c of the plate member 293 which engages with the projection 291b formed at the lower portion of the T-shaped lever 291 is guided along the locus of travel of the projection 291b. As shown in FIG. 34, the plate member 293 is caused to pivot clockwise about the pin 294 and tilts. As a result, the pressing portion 293a of the plate member 293 is moved leftward with respect to the position at which the pressing portion 293a confronts the arm 288b of the latch operating member 288. Therefore, even if the plate member 293 is moved downward by operating the door outer handle 271 or the door inner handle 274, the arm 288b is not pressed downward. That is, even if the door outer handle 271 or the door inner handle 274 is operated to open the door 261, the latch 287 cannot be rotated. Thus, the door 261 is kept locked.

In this embodiment, a push plate 300 pivotally supported by a shaft 300a is mounted on the lower portion of the mounting portion 271b of the outer handle rod 271a, and the lock interlocking switch 275 is disposed below the push plate 300 so that the lock interlocking switch 275 can be turned on by opening the door 261 by means of the door outer handle 271. A slot 300b is formed in the middle of the push plate 300 in the longitudinal direction thereof. A guide pin 301 mounted on the plate member 293 is slidably inserted in the slot 300b.

In the above-described construction, when the door lock device 270 is kept unlocked as shown in FIG. 31, the outer handle rod 271a, the push plate 300, and the lock interlocking switch 275 are located substantially vertically aligned. Therefore, the push plate 300 is pressed downward when the outer handle rod 271a is pressed downward by opening the door 261 by means of the door outer handle 271. Thus, the push plate 300 presses the head 275a of the lock interlocking switch 275 downward. As a result, both terminals 275b and 275c of the lock interlocking switch 275 are connected with each other and the lock interlocking switch 275 is turned on.

When the door inner handle 274 is operated in the condition in which the door lock device 270 is unlocked, the straight lever 292 pivots counterclockwise and the plate member 293 is moved downward. At this time, since the pin 294 slides in the slot 271c of the outer handle rod mounting portion 271b and the guide pin 301 slides in the slot 300b of the push plate 300, neither the outer handle rod 271a nor the push plate 300 moves and only the plate member 293 moves downward. Accordingly, in this case, the latch operating member 288 pivots due to the downward movement of the plate member 293 and the latch 287 is caused to pivot. Therefore, the door 261 can be opened, but the lock interlocking switch 275 is not turned on.

On the other hand, when the door lock device 270 is locked, the lock assembly 290 is tilted (refer to FIG. 34) and the push plate 300 is tilted as well by the guide pin 301. Therefore, even though the outer handle rod 271a is pressed downward, the lock interlocking switch 275 never be turned on.

That is, the lock interlocking switch 275 is turned on when the door lock device 270 is unlocked and the door 261 is opened by the door outer handle 271. In contrast, when the door inner handle 274 is operated and when the door lock device 270 is locked, the lock interlocking switch 275 is not turned on even if the door 261 is opened by the door outer handle 271.

As described above, according to this embodiment, the lock interlocking switch 275 is turned on only when the door lock device 270 is unlocked and the door 261 is opened by the door outer handle 271 (or at least the door outer handle is operated). In addition, the perfume atomizing unit 280 atomizes the perfume for a fixed period of time when the lock interlocking switch 275 is turned on. Therefore, the perfume can be reliably atomized to the automobile only when a driver gets into the automobile. Accordingly, the perfume is never wasted.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A perfume emitting arrangement for use in an automobile, comprising:
    a door lock device for locking a door of the automobile;
    a door outer handle connected to said door lock device and adapted to perform an operation for opening the door from outside of the automobile; and
    a perfume emitting means for emitting a perfume emitting material to an inside of the automobile only when said door lock device is unlocked and the operation for opening the door is performed by said door outer handle.

2. The perfume emitting arrangement according to claim 1, further comprising a switch means operable in association with the operation of said door outer handle only when said door lock device is unlocked.

3. The perfume emitting arrangement according to claim 2, further comprising a timer means electrically connected with said switch means for allowing said perfume emitting means to emit the perfume emitting material only for a predetermined period of time.

4. A perfume emitting arrangement for use in an automobile having a door with a door outer handle adapted for use in opening the door from outside of the automobile, said arrangement comprising:
    latching means for latching the door closed, and for unlatching the door upon operation of the door outer handle;
    coupling means for operatively coupling said latching means to the door outer handle;
    locking means for locking said latching means against unlatching the door, and for unlocking said latching means; and
    perfume emitting means for emitting perfume emitting material only when said latching means is unlocked and the latching means is operated by said coupling means to unlatch the door.

5. The perfume emitting arrangement according to claim 4, wherein
    said perfume emitting means comprises a means for storing the perfume emitting material, a means for delivering the perfume emitting material from said storing means to an inside of the automobile, and a means for actuating said delivering means.

6. The perfume emitting arrangement according to claim 5, wherein
    said actuating means comprises a power supply connectable to said delivering means, and a switch means for connecting said power supply to said delivering means; and
    said door lock device comprises means for operating said switch means to connect said power supply to said delivering means only when said latching means is unlocked.

7. The perfume emitting arrangement according to claim 6, wherein
    said actuating means further comprises timer means for disconnecting said power supply means from said delivering means after said delivering means has delivered the perfume emitting material for a predetermined time.

8. The perfume emitting arrangement according to claim 5, wherein
    said storing means and said delivering means together define a spray means for storing and spraying the perfume emitting material; and
    said actuating means comprises a rod adapted to move between a first position in which it causes actuation of said spray means and a second position in which it does not cause actuation of said spray means, a solenoid means for moving said rod between its first and second positions, and a means for energizing said solenoid.

9. The perfume emitting arrangement according to claim 4, wherein
    a switch means is provided for actuating said perfume emitting means upon being activated;
    said locking means comprises a means for activating said switch means, said activating means including a push plate adapted to be moved between a first position in which it activates said switch means, a second position in which it does not activate said switch means but is movable directly into said first position, and a third position in which it is prevented from being moved into said first position; and
    said locking means further comprises means for operatively connecting said push plate to a door lock knob, a key cylinder, the door outer handle, and a door inner handle, for moving said push plate to said third position when either of the door lock knob and the key cylinder is in a locked condition, fir moving said push plate from said second position to said first position when the door outer handle is operated, and for preventing movement of said push plate upon operation of the door inner handle.

10. A perfume emitting device for use in an automobile having a door, said device comprising:
    means for storing a perfume material;
    a perfume emitting means for emitting the perfume material from said storing means;
    a detecting means for detecting when the door of the automobile has been opened;
    an operation means, operatively connected to said perfume emitting means and said detecting means, for causing said perfume emitting means to emit the perfume material for a first predetermined period of time after said detecting means has detected that the door of the automobile has been opened; and
    an operation prohibiting means for prohibiting said perfume emitting means from emitting the perfume material for a second predetermined period of time after said perfume emitting means has once emitted the perfume material even when said detecting means has detected that the door of the automobile has been opened.

11. The perfume emitting device according to claim 10, wherein said operation means comprises an electrically driven pump, said detecting means comprises a door switch and said operation prohibiting means comprises a timer.

12. The perfume emitting device according to claim 10, wherein
   said perfume emitting means is operable to emit the perfume material by atomizing the perfume material.

13. The perfume emitting device according to claim 10, wherein
   said storing means comprises a tank adapted to contain a liquid perfume material; and
   said perfume emitting means comprises a nozzle fluidically connected to said tank.

14. The perfume emitting device according to claim 13, wherein
   said nozzle is fluidically connected to said tank by a flexible tube such that said nozzle can be mounted at a location remote from said tank.

15. The perfume emitting device according to claim 13, wherein
   said perfume emitting means further comprises a pump means for pumping the perfume material from said tank to said nozzle.

* * * * *